(12) United States Patent
Smith et al.

(10) Patent No.: US 8,600,783 B2
(45) Date of Patent: Dec. 3, 2013

(54) BUSINESS TO BUSINESS COMPUTER SYSTEM FOR COMMUNICATING AND PROCESSING RENTAL CAR RESERVATIONS USING WEB SERVICES

(75) Inventors: David Gary Smith, Wildwood, MO (US); Anita K. Klopfenstein, O'Fallon, IL (US); Russell E. Dittmar, St. Charles, MO (US); Carl E. Epperly, Manchester, MO (US); Gary K. Thomae, Shipman, IL (US)

(73) Assignee: The Crawford Group, Inc., St. Louis, MO (US)

( * ) Notice: Subject to any disclaimer, the term of this patent is extended or adjusted under 35 U.S.C. 154(b) by 2485 days.

(21) Appl. No.: 10/865,116

(22) Filed: Jun. 10, 2004

(65) Prior Publication Data

US 2005/0091087 A1   Apr. 28, 2005

Related U.S. Application Data

(63) Continuation-in-part of application No. 10/343,576, filed as application No. PCT/US01/51437 on Oct. 19, 2001, and a continuation-in-part of application No. 09/694,050, filed on Oct. 20, 2000, which is a continuation-in-part of application No. 09/641,820, filed on Aug. 18, 2000, now Pat. No. 7,275,038, application No. 10/865,116, which is a continuation-in-part of application No. 10/028,073, filed on Dec. 26, 2001, now abandoned, which is a continuation-in-part of application No. PCT/US01/51437, which is a continuation-in-part of application No. 09/694,050, which is a continuation-in-part of application No. 09/641,820.

(51) Int. Cl.
*G06Q 10/00* (2012.01)

(52) U.S. Cl.
USPC .......................................................... 705/5

(58) Field of Classification Search
USPC .......................................................... 705/5
See application file for complete search history.

(56) References Cited

U.S. PATENT DOCUMENTS 3,665,397 A   5/1972   Di Napoli et al.
4,714,989 A   12/1987  Billings (Continued)

FOREIGN PATENT DOCUMENTS

JP   2002074126 A    9/2000
JP   02001344490 A   12/2001

(Continued)

OTHER PUBLICATIONS

Darrah, Matt "Hi-tech Steamlines Car Rental Process," Canadian Underwriter v66n2, p. 29, Feb. 1999.*

(Continued)

*Primary Examiner* — Allen J Jung
(74) *Attorney, Agent, or Firm* — Thompson Coburn LLP

(57) ABSTRACT

An Internet-enabled automatic rental vehicle transaction system, the system comprising a web service connector in communication with a rental vehicle software program, the web service connector being configured to (1) receive, via a network, a document from a computer system of an authorized purchaser of rental vehicle services on behalf of another, the document comprising a web service rental vehicle reservation request, (2) process the received document in accordance with a web service specification document to create one or more data objects having a format supported by the rental vehicle software program, and (3) communicate the one or more data objects to the rental vehicle software program, and wherein the rental vehicle software program is configured to automatically process the one or more data objects for fulfillment of the reservation request.

64 Claims, 6 Drawing Sheets

(56) References Cited

U.S. PATENT DOCUMENTS

| | | | |
|---|---|---|---|
| 4,757,267 | A | 7/1988 | Riskin |
| 4,774,663 | A | 9/1988 | Musmanno et al. |
| 4,788,643 | A | 11/1988 | Trippe et al. |
| 4,797,818 | A | 1/1989 | Cotter |
| 4,799,156 | A | 1/1989 | Shavit et al. |
| 4,831,526 | A | 5/1989 | Luchs et al. |
| 4,858,121 | A | 8/1989 | Barber et al. |
| 4,891,785 | A | 1/1990 | Donohoo |
| 4,897,867 | A | 1/1990 | Foster et al. |
| 4,899,292 | A | 2/1990 | Montagna et al. |
| 4,916,611 | A | 4/1990 | Doyle, Jr. et al. |
| 4,931,932 | A | 6/1990 | Dalnekoff et al. |
| 4,951,196 | A | 8/1990 | Jackson |
| 4,984,155 | A | 1/1991 | Geier et al. |
| 5,058,044 | A | 10/1991 | Stewart et al. |
| 5,063,506 | A | 11/1991 | Brockwell et al. |
| 5,182,705 | A | 1/1993 | Barr et al. |
| 5,210,687 | A | 5/1993 | Wolfberg et al. |
| 5,216,592 | A | 6/1993 | Mann et al. |
| 5,218,697 | A | 6/1993 | Chung |
| 5,224,034 | A | 6/1993 | Katz et al. |
| 5,237,499 | A | 8/1993 | Garback |
| 5,253,165 | A | 10/1993 | Leiseca et al. |
| 5,270,922 | A | 12/1993 | Higgins |
| 5,289,369 | A | 2/1994 | Hirshberg |
| 5,309,355 | A | 5/1994 | Lockwood |
| 5,311,425 | A | 5/1994 | Inada |
| 5,319,542 | A | 6/1994 | King, Jr. et al. |
| 5,355,474 | A | 10/1994 | Thuraisngham et al. |
| 5,361,199 | A | 11/1994 | Shoquist et al. |
| 5,369,570 | A | 11/1994 | Parad |
| 5,375,207 | A | 12/1994 | Blakely et al. |
| 5,390,314 | A | 2/1995 | Swanson |
| 5,396,600 | A | 3/1995 | Thompson et al. |
| 5,406,475 | A | 4/1995 | Kouchi et al. |
| 5,422,809 | A | 6/1995 | Griffin et al. |
| 5,432,904 | A | 7/1995 | Wong |
| 5,465,206 | A | 11/1995 | Hilt et al. |
| 5,471,615 | A | 11/1995 | Amatsu et al. |
| 5,475,585 | A | 12/1995 | Bush |
| 5,504,674 | A | 4/1996 | Chen et al. |
| 5,506,897 | A | 4/1996 | Moore et al. |
| 5,515,268 | A | 5/1996 | Yoda |
| 5,528,490 | A | 6/1996 | Hill |
| 5,530,844 | A | 6/1996 | Phillips et al. |
| 5,544,040 | A | 8/1996 | Gerbaulet |
| 5,544,320 | A | 8/1996 | Konrad |
| 5,550,734 | A | 8/1996 | Tarter et al. |
| 5,557,515 | A | 9/1996 | Abbruzzese et al. |
| 5,557,518 | A | 9/1996 | Rosen |
| 5,570,283 | A | 10/1996 | Shoolery et al. |
| 5,581,461 | A | 12/1996 | Coll et al. |
| 5,586,312 | A * | 12/1996 | Johnson et al. ................ 1/1 |
| 5,586,313 | A | 12/1996 | Schnittker et al. |
| 5,588,048 | A | 12/1996 | Neville |
| 5,592,375 | A | 1/1997 | Salmon et al. |
| 5,592,378 | A | 1/1997 | Cameron et al. |
| 5,640,505 | A | 6/1997 | Hearn et al. |
| 5,644,721 | A | 7/1997 | Chung et al. |
| 5,664,207 | A | 9/1997 | Crumpler et al. |
| 5,666,493 | A | 9/1997 | Wojcik et al. |
| 5,694,551 | A | 12/1997 | Doyle et al. |
| 5,696,901 | A | 12/1997 | Konrad |
| 5,696,965 | A | 12/1997 | Dedrick |
| 5,710,887 | A | 1/1998 | Chelliah et al. |
| 5,710,889 | A | 1/1998 | Clark et al. |
| 5,712,989 | A | 1/1998 | Johnson et al. |
| 5,721,832 | A | 2/1998 | Westrope et al. |
| 5,721,913 | A | 2/1998 | Ackroff et al. |
| 5,724,520 | A | 3/1998 | Goheen |
| 5,726,885 | A | 3/1998 | Klein et al. |
| 5,732,398 | A | 3/1998 | Tagawa |
| 5,734,823 | A | 3/1998 | Saigh et al. |
| 5,754,772 | A | 5/1998 | Leaf |
| 5,754,830 | A | 5/1998 | Butts et al. |
| 5,757,925 | A | 5/1998 | Faybishenko |
| 5,758,329 | A | 5/1998 | Wojcik et al. |
| 5,758,341 | A | 5/1998 | Voss |
| 5,764,981 | A | 6/1998 | Brice et al. |
| 5,768,510 | A | 6/1998 | Gish |
| 5,768,511 | A | 6/1998 | Galvin et al. |
| 5,774,873 | A | 6/1998 | Berent et al. |
| 5,778,178 | A | 7/1998 | Arunachalam |
| 5,781,892 | A | 7/1998 | Hunt et al. |
| 5,784,565 | A | 7/1998 | Lewine |
| 5,793,966 | A | 8/1998 | Amstein et al. |
| 5,794,207 | A | 8/1998 | Walker et al. |
| 5,796,634 | A | 8/1998 | Craport et al. |
| 5,796,967 | A | 8/1998 | Filepp et al. |
| 5,797,126 | A | 8/1998 | Helbling et al. |
| 5,799,157 | A | 8/1998 | Escallon |
| 5,799,289 | A | 8/1998 | Fukushima et al. |
| 5,802,293 | A | 9/1998 | van der Sijpt |
| 5,802,530 | A | 9/1998 | Van Hoff |
| 5,805,689 | A | 9/1998 | Neville |
| 5,805,829 | A | 9/1998 | Cohen et al. |
| 5,808,894 | A | 9/1998 | Wiens et al. |
| 5,809,478 | A | 9/1998 | Greco et al. |
| 5,812,067 | A | 9/1998 | Bergholz et al. |
| 5,818,715 | A | 10/1998 | Marshall et al. |
| 5,819,274 | A | 10/1998 | Jackson, Jr. |
| 5,832,451 | A * | 11/1998 | Flake et al. ................ 705/5 |
| 5,832,452 | A | 11/1998 | Schneider et al. |
| 5,832,454 | A | 11/1998 | Jafri et al. |
| 5,835,724 | A | 11/1998 | Smith |
| 5,838,910 | A | 11/1998 | Domenikos et al. |
| 5,838,916 | A | 11/1998 | Domenikos et al. |
| 5,839,112 | A | 11/1998 | Schreitmueller et al. |
| 5,839,114 | A | 11/1998 | Lynch et al. |
| 5,842,176 | A | 11/1998 | Hunt et al. |
| 5,845,077 | A | 12/1998 | Fawcett |
| 5,847,957 | A | 12/1998 | Cohen et al. |
| 5,848,131 | A | 12/1998 | Shaffer et al. |
| 5,848,241 | A | 12/1998 | Misinai et al. |
| 5,850,446 | A | 12/1998 | Berger et al. |
| 5,857,191 | A | 1/1999 | Blackwell, Jr. et al. |
| 5,862,346 | A | 1/1999 | Kley et al. |
| 5,864,818 | A | 1/1999 | Feldman |
| 5,864,827 | A | 1/1999 | Wilson |
| RE36,111 | E | 2/1999 | Neville |
| 5,870,719 | A | 2/1999 | Maritzen et al. |
| 5,870,733 | A | 2/1999 | Bass et al. |
| 5,875,110 | A | 2/1999 | Jacobs |
| 5,877,765 | A | 3/1999 | Dickman et al. |
| 5,881,230 | A | 3/1999 | Christensen et al. |
| 5,889,863 | A | 3/1999 | Weber |
| 5,889,942 | A | 3/1999 | Orenshteyn |
| 5,890,129 | A | 3/1999 | Spurgeon |
| 5,890,140 | A | 3/1999 | Clark et al. |
| 5,892,905 | A | 4/1999 | Brandt et al. |
| 5,893,904 | A | 4/1999 | Harris et al. |
| 5,897,620 | A | 4/1999 | Walker et al. |
| 5,898,835 | A | 4/1999 | Truong |
| 5,901,214 | A | 5/1999 | Shaffer et al. |
| 5,903,873 | A | 5/1999 | Peterson et al. |
| 5,907,608 | A | 5/1999 | Shaffer et al. |
| 5,909,542 | A | 6/1999 | Paquette et al. |
| 5,909,570 | A | 6/1999 | Webber |
| 5,909,581 | A | 6/1999 | Park |
| 5,910,982 | A | 6/1999 | Shaffer et al. |
| 5,915,241 | A | 6/1999 | Giannini |
| 5,918,215 | A | 6/1999 | Yoshioka et al. |
| 5,920,696 | A | 7/1999 | Brandt et al. |
| 5,923,552 | A | 7/1999 | Brown et al. |
| 5,926,793 | A | 7/1999 | de Rafael et al. |
| 5,926,798 | A | 7/1999 | Carter |
| 5,930,474 | A | 7/1999 | Dunworth et al. |
| 5,931,878 | A | 8/1999 | Chapin, Jr. |
| 5,931,917 | A | 8/1999 | Nguyen et al. |
| 5,933,810 | A | 8/1999 | Okawa |
| 5,944,784 | A | 8/1999 | Simonoff et al. |
| 5,946,660 | A | 8/1999 | McCarty et al. |
| 5,946,687 | A | 8/1999 | Gehani et al. |
| 5,948,040 | A | 9/1999 | DeLorme et al. |

(56) References Cited

U.S. PATENT DOCUMENTS

| | | |
|---|---|---|
| 5,950,169 A * | 9/1999 | Borghesi et al. ............ 705/4 |
| 5,953,706 A | 9/1999 | Patel |
| 5,956,397 A | 9/1999 | Shaffer et al. |
| 5,956,487 A | 9/1999 | Venkatraman et al. |
| 5,956,509 A | 9/1999 | Kevner |
| 5,956,706 A | 9/1999 | Carey et al. |
| 5,961,569 A | 10/1999 | Craport et al. |
| 5,961,572 A | 10/1999 | Craport et al. |
| 5,963,915 A | 10/1999 | Kirsch |
| 5,966,451 A | 10/1999 | Utsumi |
| 5,970,475 A | 10/1999 | Barnes et al. |
| 5,973,619 A | 10/1999 | Paredes |
| 5,974,444 A | 10/1999 | Konrad |
| 5,977,966 A | 11/1999 | Bogdan |
| 5,978,577 A | 11/1999 | Rierden et al. |
| 5,978,747 A | 11/1999 | Craport et al. |
| 5,978,817 A | 11/1999 | Giannandrea et al. |
| 5,978,834 A | 11/1999 | Simonoff et al. |
| 5,978,840 A | 11/1999 | Nguyen et al. |
| 5,982,867 A | 11/1999 | Urban et al. |
| 5,982,868 A | 11/1999 | Shaffer et al. |
| 5,983,200 A | 11/1999 | Slotznick |
| 5,983,208 A | 11/1999 | Haller et al. |
| 5,987,423 A | 11/1999 | Arnold et al. |
| 5,991,739 A | 11/1999 | Cupps et al. |
| 5,995,939 A | 11/1999 | Berman et al. |
| 5,996,017 A | 11/1999 | Cipiere |
| 6,002,767 A | 12/1999 | Kramer |
| 6,005,568 A | 12/1999 | Simonoff et al. |
| 6,006,148 A | 12/1999 | Strong |
| 6,006,201 A | 12/1999 | Berent et al. |
| 6,009,464 A | 12/1999 | Hamilton et al. |
| 6,012,083 A | 1/2000 | Savitzky et al. |
| 6,014,673 A | 1/2000 | Davis et al. |
| 6,014,702 A | 1/2000 | King et al. |
| 6,016,496 A | 1/2000 | Roberson |
| 6,018,627 A | 1/2000 | Iyengar et al. |
| 6,021,406 A | 2/2000 | Kuznetsov |
| 6,023,679 A | 2/2000 | Acebo et al. |
| 6,026,379 A | 2/2000 | Haller et al. |
| 6,029,175 A | 2/2000 | Chow et al. |
| 6,031,533 A | 2/2000 | Peddada et al. |
| 6,043,815 A | 3/2000 | Simonoff et al. |
| 6,044,382 A | 3/2000 | Martino |
| 6,049,671 A | 4/2000 | Slivka et al. |
| 6,049,774 A | 4/2000 | Roy |
| 6,049,832 A | 4/2000 | Brim et al. |
| 6,054,983 A | 4/2000 | Simonoff et al. |
| 6,058,179 A | 5/2000 | Shaffer et al. |
| 6,058,378 A | 5/2000 | Clark et al. |
| 6,061,665 A | 5/2000 | Bahreman |
| 6,061,691 A | 5/2000 | Fox |
| 6,064,973 A | 5/2000 | Smith et al. |
| 6,070,142 A | 5/2000 | McDonough et al. |
| 6,072,870 A | 6/2000 | Nguyen et al. |
| 6,073,163 A | 6/2000 | Clark et al. |
| 6,073,214 A | 6/2000 | Fawcett |
| 6,076,066 A | 6/2000 | DiRienzo et al. |
| 6,076,067 A | 6/2000 | Jacobs et al. |
| 6,078,321 A | 6/2000 | Simonoff et al. |
| 6,078,322 A | 6/2000 | Simonoff et al. |
| 6,084,585 A | 7/2000 | Kraft et al. |
| 6,085,169 A | 7/2000 | Walker et al. |
| 6,085,170 A | 7/2000 | Tsukuda |
| 6,088,677 A | 7/2000 | Spurgeon |
| 6,091,409 A | 7/2000 | Dickman et al. |
| 6,091,412 A | 7/2000 | Simonoff et al. |
| 6,091,810 A | 7/2000 | Shaffer et al. |
| 6,094,640 A | 7/2000 | Goheen |
| 6,094,679 A | 7/2000 | Teng et al. |
| 6,097,802 A | 8/2000 | Fleischer, III et al. |
| 6,101,496 A | 8/2000 | Esposito |
| 6,108,650 A | 8/2000 | Musk et al. |
| 6,112,185 A | 8/2000 | Walker et al. |
| 6,119,105 A | 9/2000 | Williams |
| 6,119,149 A | 9/2000 | Notani |
| 6,122,642 A | 9/2000 | Mehovic |
| 6,125,384 A | 9/2000 | Brandt et al. |
| 6,125,391 A | 9/2000 | Meltzer et al. |
| 6,144,944 A | 11/2000 | Kurtzman, II et al. |
| 6,144,990 A | 11/2000 | Brandt et al. |
| 6,148,289 A | 11/2000 | Virdy |
| 6,148,290 A | 11/2000 | Dan et al. |
| 6,154,172 A | 11/2000 | Piccionelli et al. |
| 6,163,772 A | 12/2000 | Kramer et al. |
| 6,167,567 A | 12/2000 | Chiles et al. |
| 6,175,832 B1 | 1/2001 | Luzzi et al. |
| 6,178,409 B1 | 1/2001 | Weber et al. |
| 6,185,290 B1 | 2/2001 | Shaffer et al. |
| 6,185,540 B1 | 2/2001 | Schreitmueller et al. |
| 6,189,003 B1 | 2/2001 | Leal |
| 6,192,415 B1 | 2/2001 | Haverstock et al. |
| 6,205,482 B1 | 3/2001 | Navarre et al. |
| 6,223,094 B1 | 4/2001 | Muehleck et al. |
| 6,226,654 B1 | 5/2001 | Van Hoff |
| 6,226,675 B1 | 5/2001 | Meltzer et al. |
| 6,229,534 B1 | 5/2001 | Gerra et al. |
| 6,230,117 B1 | 5/2001 | Lymer et al. |
| 6,233,329 B1 | 5/2001 | Urban et al. |
| 6,233,609 B1 | 5/2001 | Mittal |
| 6,240,365 B1 | 5/2001 | Bunn |
| 6,253,188 B1 | 6/2001 | Witek et al. |
| 6,263,322 B1 | 7/2001 | Kirkevold et al. |
| 6,272,528 B1 | 8/2001 | Cullen et al. |
| 6,272,675 B1 | 8/2001 | Schrab et al. |
| 6,275,843 B1 | 8/2001 | Chorn |
| 6,282,489 B1 | 8/2001 | Bellesfield et al. |
| 6,282,517 B1 | 8/2001 | Wolfe et al. |
| 6,282,568 B1 | 8/2001 | Sondur et al. |
| 6,286,028 B1 | 9/2001 | Cohen et al. |
| 6,292,185 B1 | 9/2001 | Ko et al. |
| 6,304,892 B1 | 10/2001 | Bhoj et al. |
| 6,308,120 B1 | 10/2001 | Good |
| 6,308,160 B1 | 10/2001 | Rex |
| 6,311,207 B1 | 10/2001 | Mighdoll et al. |
| 6,311,213 B2 | 10/2001 | Dawson et al. |
| 6,324,568 B1 | 11/2001 | Diec |
| 6,327,574 B1 | 12/2001 | Kramer et al. |
| 6,327,617 B1 | 12/2001 | Fawcett |
| 6,332,163 B1 | 12/2001 | Bowman-Amuah |
| 6,334,146 B1 | 12/2001 | Parasnis et al. |
| 6,336,100 B1 | 1/2002 | Yamada |
| 6,339,773 B1 | 1/2002 | Rishe |
| 6,343,290 B1 | 1/2002 | Cossins et al. |
| 6,347,398 B1 | 2/2002 | Parthasarathy et al. |
| 6,351,738 B1 | 2/2002 | Clark |
| 6,360,205 B1 | 3/2002 | Iyengar et al. |
| 6,363,388 B1 | 3/2002 | Sprenger et al. |
| 6,370,523 B1 | 4/2002 | Anderson |
| 6,381,324 B1 | 4/2002 | Shaffer et al. |
| 6,381,603 B1 | 4/2002 | Chan et al. |
| 6,381,617 B1 | 4/2002 | Frolund et al. |
| 6,385,312 B1 | 5/2002 | Shaffer et al. |
| 6,389,431 B1 | 5/2002 | Frolund et al. |
| 6,393,415 B1 | 5/2002 | Getchius et al. |
| 6,393,471 B1 | 5/2002 | Kobata |
| 6,397,191 B1 | 5/2002 | Notani et al. |
| 6,397,208 B1 | 5/2002 | Lee |
| 6,397,219 B2 | 5/2002 | Mills |
| 6,401,094 B1 | 6/2002 | Stemp et al. |
| 6,418,400 B1 | 7/2002 | Webber |
| 6,418,554 B1 | 7/2002 | Delo et al. |
| 6,477,452 B2 | 11/2002 | Good |
| 6,542,912 B2 | 4/2003 | Meltzer et al. |
| 6,567,783 B1 | 5/2003 | Notani et al. |
| 6,609,050 B2 | 8/2003 | Li |
| 6,694,234 B2 | 2/2004 | Lockwood et al. |
| 6,732,358 B1 | 5/2004 | Siefert |
| 6,757,698 B2 | 6/2004 | McBride et al. |
| 6,802,061 B1 | 10/2004 | Parthasarathy et al. |
| 6,910,040 B2 | 6/2005 | Emmick et al. |
| 6,965,886 B2 | 11/2005 | Govrin et al. |
| 6,968,388 B1 | 11/2005 | Fuldseth et al. |
| 6,976,251 B2 | 12/2005 | Meyerson |

(56) References Cited

U.S. PATENT DOCUMENTS

| | | |
|---|---|---|
| 7,020,620 B1 | 3/2006 | Bargnes et al. |
| 7,050,986 B1 | 5/2006 | Vance et al. |
| 7,062,765 B1 | 6/2006 | Pitzel et al. |
| 7,089,588 B2 | 8/2006 | Schaefer et al. |
| 7,136,821 B1 | 11/2006 | Kohavi et al. |
| 7,275,038 B1 | 9/2007 | Weinstock et al. |
| 7,324,951 B2 | 1/2008 | Renwick et al. |
| 7,328,166 B1 | 2/2008 | Geoghegan et al. |
| 7,899,690 B1 | 3/2011 | Weinstock et al. |
| 8,160,906 B2 | 4/2012 | Smith et al. |
| 8,160,907 B2 | 4/2012 | Smith et al. |
| 8,340,989 B2 | 12/2012 | Weinstock et al. |
| 2001/0005831 A1 | 6/2001 | Lewin et al. |
| 2001/0008998 A1 | 7/2001 | Tamaki et al. |
| 2001/0010058 A1 | 7/2001 | Mittal |
| 2001/0011222 A1 | 8/2001 | McLauchlin et al. |
| 2001/0011246 A1 | 8/2001 | Tammaro |
| 2001/0014907 A1 | 8/2001 | Brebner |
| 2001/0016825 A1 | 8/2001 | Pugliese, III et al. |
| 2001/0016868 A1 | 8/2001 | Nakamura et al. |
| 2001/0018661 A1 | 8/2001 | Sato et al. |
| 2001/0021912 A1 | 9/2001 | DeMarcken et al. |
| 2001/0027420 A1 | 10/2001 | Boublik et al. |
| 2001/0027439 A1* | 10/2001 | Holtzman et al. .............. 705/39 |
| 2001/0027483 A1 | 10/2001 | Gupta et al. |
| 2001/0029459 A1 | 10/2001 | Fujiwara |
| 2001/0032113 A1 | 10/2001 | Rudnick |
| 2001/0032273 A1 | 10/2001 | Cheng |
| 2001/0037224 A1 | 11/2001 | Eldridge et al. |
| 2001/0037255 A1 | 11/2001 | Tambay et al. |
| 2001/0037298 A1 | 11/2001 | Ehrman et al. |
| 2001/0037331 A1 | 11/2001 | Lloyd |
| 2001/0044811 A1 | 11/2001 | Ballantyne et al. |
| 2001/0056361 A1 | 12/2001 | Sendouda |
| 2002/0004796 A1 | 1/2002 | Vange et al. |
| 2002/0007289 A1 | 1/2002 | Malin et al. |
| 2002/0010604 A1 | 1/2002 | Block |
| 2002/0010781 A1 | 1/2002 | Tuatini |
| 2002/0013767 A1 | 1/2002 | Katz |
| 2002/0019821 A1 | 2/2002 | Rosenbluth |
| 2002/0022979 A1 | 2/2002 | Whipp et al. |
| 2002/0026336 A1* | 2/2002 | Eizenburg et al. ................ 705/5 |
| 2002/0026337 A1 | 2/2002 | Sasaki |
| 2002/0032626 A1 | 3/2002 | DeWolf et al. |
| 2002/0032706 A1 | 3/2002 | Perla et al. |
| 2002/0032790 A1 | 3/2002 | Linderman |
| 2002/0035488 A1 | 3/2002 | Aquila et al. |
| 2002/0040352 A1 | 4/2002 | McCormick |
| 2002/0042843 A1 | 4/2002 | Diec |
| 2002/0042849 A1 | 4/2002 | Ho et al. |
| 2002/0046213 A1 | 4/2002 | Vinati et al. |
| 2002/0046294 A1 | 4/2002 | Brodsky et al. |
| 2002/0046301 A1 | 4/2002 | Shannon et al. |
| 2002/0049603 A1 | 4/2002 | Mehra et al. |
| 2002/0059345 A1* | 5/2002 | Wang et al. .................... 707/513 |
| 2002/0062262 A1 | 5/2002 | Vasconi et al. |
| 2002/0069123 A1 | 6/2002 | Soderlind et al. |
| 2002/0072937 A1 | 6/2002 | Domenick et al. |
| 2002/0072938 A1 | 6/2002 | Black et al. |
| 2002/0073012 A1 | 6/2002 | Lowell et al. |
| 2002/0073236 A1 | 6/2002 | Helgeson et al. |
| 2002/0076029 A1 | 6/2002 | Shaffer et al. |
| 2002/0077871 A1 | 6/2002 | Udelhoven et al. |
| 2002/0082912 A1 | 6/2002 | Batachia et al. |
| 2002/0083095 A1 | 6/2002 | Wu et al. |
| 2002/0083099 A1 | 6/2002 | Knauss et al. |
| 2002/0087374 A1 | 7/2002 | Boubez et al. |
| 2002/0091533 A1 | 7/2002 | Ims et al. |
| 2002/0095319 A1 | 7/2002 | Swart et al. |
| 2002/0099562 A1 | 7/2002 | Bruce, Sr. et al. |
| 2002/0099575 A1 | 7/2002 | Hubbard et al. |
| 2002/0099613 A1 | 7/2002 | Swart et al. |
| 2002/0099735 A1 | 7/2002 | Schroeder et al. |
| 2002/0099738 A1 | 7/2002 | Grant |
| 2002/0106069 A1 | 8/2002 | Shaffer et al. |
| 2002/0107918 A1 | 8/2002 | Shaffer et al. |
| 2002/0111846 A1 | 8/2002 | Singer |
| 2002/0111876 A1 | 8/2002 | Rudraraju et al. |
| 2002/0116205 A1 | 8/2002 | Ankireddipally et al. |
| 2002/0116454 A1 | 8/2002 | Dyla et al. |
| 2002/0120459 A1 | 8/2002 | Dick et al. |
| 2002/0120776 A1 | 8/2002 | Eggebraaten et al. |
| 2002/0129021 A1 | 9/2002 | Brown |
| 2002/0133359 A1 | 9/2002 | Brown |
| 2002/0133517 A1 | 9/2002 | Carlson et al. |
| 2002/0136381 A1 | 9/2002 | Shaffer et al. |
| 2002/0143644 A1 | 10/2002 | Tosun et al. |
| 2002/0143819 A1 | 10/2002 | Han et al. |
| 2002/0152100 A1 | 10/2002 | Chen et al. |
| 2002/0156693 A1 | 10/2002 | Stewart et al. |
| 2002/0156865 A1 | 10/2002 | Rajarajan et al. |
| 2002/0169842 A1 | 11/2002 | Christensen et al. |
| 2002/0178087 A1 | 11/2002 | Henderson et al. |
| 2002/0184054 A1 | 12/2002 | Cox et al. |
| 2002/0184219 A1 | 12/2002 | Preisig et al. |
| 2002/0184266 A1 | 12/2002 | Blessin |
| 2002/0186144 A1 | 12/2002 | Meunier |
| 2002/0188761 A1 | 12/2002 | Chikirivao et al. |
| 2002/0194219 A1 | 12/2002 | Bradley et al. |
| 2002/0198743 A1 | 12/2002 | Ariathurai et al. |
| 2003/0004746 A1 | 1/2003 | Kheirolomoom et al. |
| 2003/0004822 A1 | 1/2003 | Shorter et al. |
| 2003/0005181 A1 | 1/2003 | Bau et al. |
| 2003/0009545 A1 | 1/2003 | Sahai et al. |
| 2003/0014270 A1 | 1/2003 | Qureshi et al. |
| 2003/0014295 A1 | 1/2003 | Brookes et al. |
| 2003/0014442 A1 | 1/2003 | Shiigi et al. |
| 2003/0014733 A1 | 1/2003 | Ringseth et al. |
| 2003/0018666 A1 | 1/2003 | Chen et al. |
| 2003/0023450 A1 | 1/2003 | Casati et al. |
| 2003/0023463 A1 | 1/2003 | Dombroski et al. |
| 2003/0023957 A1 | 1/2003 | Bau et al. |
| 2003/0028404 A1 | 2/2003 | Herron et al. |
| 2003/0028533 A1 | 2/2003 | Bata et al. |
| 2003/0033369 A1 | 2/2003 | Bernhard |
| 2003/0036917 A1 | 2/2003 | Hite et al. |
| 2003/0036930 A1 | 2/2003 | Matos et al. |
| 2003/0036966 A1 | 2/2003 | Amra et al. |
| 2003/0041180 A1 | 2/2003 | Schlussman |
| 2003/0050942 A1 | 3/2003 | Ruellan et al. |
| 2003/0055868 A1 | 3/2003 | Fletcher et al. |
| 2003/0074423 A1 | 4/2003 | Mayberry et al. |
| 2003/0093402 A1 | 5/2003 | Upton |
| 2003/0093403 A1 | 5/2003 | Upton |
| 2003/0093470 A1 | 5/2003 | Upton |
| 2003/0093575 A1 | 5/2003 | Upton |
| 2003/0097286 A1 | 5/2003 | Skeen |
| 2003/0101190 A1 | 5/2003 | Horvitz et al. |
| 2003/0110315 A1 | 6/2003 | Upton |
| 2003/0114967 A1 | 6/2003 | Good |
| 2003/0115548 A1 | 6/2003 | Melgar |
| 2003/0115572 A1 | 6/2003 | Zondervan et al. |
| 2003/0120464 A1 | 6/2003 | Taft et al. |
| 2003/0120502 A1 | 6/2003 | Robb et al. |
| 2003/0120665 A1 | 6/2003 | Fox et al. |
| 2003/0125992 A1 | 7/2003 | Rogers et al. |
| 2003/0126063 A1 | 7/2003 | Reuter et al. |
| 2003/0131073 A1 | 7/2003 | Lucovsky et al. |
| 2003/0135584 A1 | 7/2003 | Roberts et al. |
| 2003/0145047 A1 | 7/2003 | Upton |
| 2003/0145067 A1 | 7/2003 | Cover et al. |
| 2003/0149600 A1 | 8/2003 | Williams |
| 2003/0154111 A1 | 8/2003 | Dutra et al. |
| 2004/0039612 A1 | 2/2004 | Fitzgerald et al. |
| 2004/0054600 A1 | 3/2004 | Shike et al. |
| 2004/0107144 A1 | 6/2004 | Short |
| 2004/0243423 A1 | 12/2004 | Rix et al. |
| 2004/0243619 A1 | 12/2004 | Kelly et al. |
| 2005/0021378 A1 | 1/2005 | Weinstock et al. |
| 2005/0119921 A1 | 6/2005 | Fitzgerald et al. |
| 2005/0125261 A1 | 6/2005 | Adegan |
| 2005/0144048 A1 | 6/2005 | Belanger et al. |
| 2005/0187833 A1 | 8/2005 | Royer et al. |
| 2005/0197866 A1 | 9/2005 | Salcedo et al. |

(56) References Cited

U.S. PATENT DOCUMENTS

| | | | |
|---|---|---|---|
| 2005/0246206 | A1 | 11/2005 | Obora et al. |
| 2006/0035692 | A1 | 2/2006 | Kirby et al. |
| 2007/0198311 | A1 | 8/2007 | Menendez et al. |
| 2007/0260496 | A1 | 11/2007 | Weinstock et al. |
| 2007/0271124 | A1 | 11/2007 | Weinstock et al. |
| 2007/0271125 | A1 | 11/2007 | Weinstock et al. |
| 2008/0010105 | A1 | 1/2008 | Rose et al. |
| 2008/0046261 | A1 | 2/2008 | Cunningham |
| 2008/0162199 | A1 | 7/2008 | Smith et al. |
| 2008/0243562 | A1 | 10/2008 | Weinstock et al. |
| 2008/0243563 | A1 | 10/2008 | Weinstock et al. |
| 2008/0249814 | A1 | 10/2008 | Weinstock et al. |
| 2010/0023352 | A1 | 1/2010 | Smith et al. |
| 2011/0153372 | A1 | 6/2011 | Weinstock et al. |
| 2011/0153375 | A1 | 6/2011 | Weinstock et al. |

FOREIGN PATENT DOCUMENTS

| | | |
|---|---|---|
| WO | WO 99/66738 | 12/1999 |
| WO | 00/52601 | 9/2000 |
| WO | WO 01/97072 | 12/2001 |
| WO | 0221314 A2 | 3/2002 |
| WO | WO 02/29675 | 4/2002 |
| WO | 02057873 | 7/2002 |
| WO | 02067079 | 8/2002 |
| WO | 02067175 A2 | 8/2002 |
| WO | 02080646 | 10/2002 |
| WO | WO 02/097700 | 12/2002 |
| WO | 03/067851 A1 | 8/2003 |

OTHER PUBLICATIONS

"Many Ways to Sell" Travel Agent, p. 36, Oct. 2, 1995.*
Declaration of William G. Tingle, including Exhibits A-F, filed Jan. 12, 2006 in U.S. Appl. No. 09/641,820.
"Cieca Estimate Management Standard", Version 2.01, Feb. 3, 1999 and Jun. 19, 2001, 54 pp.
"What Is Windows Communication Foundation?", downloaded from http://msdn.microsoft.com/en-us/library/ms731082 (printer).aspx on Aug. 27, 2008, 6 pages.
CLIP, "Servlets: CGI the Java Way", Byte, May 1, 1998, pp. 55-56, vol. 23, No. 5, McGraw-Hill, Inc., St. Peterborough, US.
Curbera et al., "Unraveling the Web Services Web: An Introduction to SOAP, WSDL, and UDDI", IEEE Internet Computing, Mar. 1, 2002, pp. 86-93, vol. 6, No. 2, IEEE Service Center, New York, NY, US.
Fix Auto Collision, EMS Web Agent 1.0, White Paper, Version 1.0, Draft 01, Dec. 9, 2003, pp. 1-18.
Graham et al., "Building Web Services with Java?: Making Sense of XML, SOAP, WSDL, and UDDI", Internet Citation, Dec. 12, 2001, Retrieved from the Internet: <URL:http://proquest.safaribooksonline.com/0672321815>.
Office Action for AU Application No. 2005255376 dated Nov. 18, 2009.
Supplementary European Search Report for EP Application 05770847.1 issued Nov. 3, 2009.
Wustner et al., "Converting Business Documents: A Classification of Problems and Solutions Using XML/XSLT", Advanced Issues of E-Commerce and Web-Based Information Systems, Jun. 26-28, 2002, Proceedings of the Fourth IEEE International Workshop, Piscataway, NJ, US, IEEE, 8 pages.
U.S. Appl. No. 09/596,024, Shaffer et al.
U.S. Appl. No. 09/641,820, Weinstock et al.
U.S. Appl. No. 09/678,752, Shaffer et al.
U.S. Appl. No. 09/694,050, Weinstock et al.
U.S. Appl. No. 10/343,576, Weinstock et al.
U.S. Appl. No. 60/194,128, Aquila.
"All Open Orders for Customer No. 218556"; Motorola Corporation; Nov. 23, 1999.
Business Wire; "Cendent's Real Estate Subsidiaries Create On-Line Cross-Marketing Alliance with Rent Net; Coldwell Banker, Century 21 and ERA Join Forces with Sister Company, Rent Net"; May 7, 1998; pp. 1-3.
CarTemps Rent-A-Car; "CarTemps DIRECT" information; publication date unknown.
CarTemps Rent-A-Car; "CarTemps MPOWERENT Instruction Manual"; Copyright 2000; v1.1; publication date unknown.
CarTemps Rent-A-Car; "MPOWERENT Management System"; Copyright 2000; publication date unknown.
Darrah, Matt; "Hi-Tech Streamlines Car Rental Process"; Feb. 1999; vol. 66, Issue 2; p. 29.
"Information on Hertz Corporation"; Sep. 24, 2002; pp. 1-61.
Kiplinger's Money Power; "Booking a room, vehicle for vacation via the Net"; Copyright May 2, 1997; Chronicle Publishing Company; Downloaded from the Internet on Apr. 7, 2002.
Nelson, Stephen L.; Quicken 99 for Windows for Dummies; IDG Books Worldwide, Inc.; 1998; pp. 114, 122-124.
St. Louis Business Journal; "E-commerce Department Director Answers Questions about TWA.com"; Aug. 28, 2000; St. Louis, Missouri.
Reeves; Travel Web Site Expedia's Shares Take Off During Initial Offering; Denver Post; Nov. 11, 1999; p. C-02, entire document.
10K Report; Agency Rent-A-Car Inc.; Report No. 0127651; Section Heading: Part I, Item 1. Business; Jan. 31, 1994; p. 4 of 54.
Travel Agent; "Many Ways to Sell"; Oct. 2, 1995; vol. 0, No. 0; p. 36.
"Welcome to the Hertz Interactive Reservation Process"; Mar. 3, 2000; pp. 62-67.
Yenckel, James, T.; "For This Cyberspace Visitor, Once Is More Than Enough"; The Washington Post; Feb. 11, 1996; Downloaded from the Internet on Apr. 7, 2002.
Specification and Drawings for U.S. Appl. No. 09/694,050, filed Oct. 20, 2000.
Specification and Drawings for U.S. Appl. No. 09/564,911, filed May 4, 2000.
Specification and Drawings for U.S. Appl. No. 09/698,491, filed Oct. 27, 2000.
Specification and Drawings for U.S. Appl. No. 09/698,502, filed Oct. 27, 2000.
Specification and Drawings for U.S. Appl. No. 09/698,552, filed Oct. 27, 2000.
1997 Rental Systems Manual, 1997.
A Call to ARMS, 1996.
AACB35 Fax Display, pp. 1-5.
AACM07, Customer Add/Update, Revised Documentation, pp. 1-12, Sep. 17, 2001.
AAGP12, Group/Branch Name and Address Add/Update, pp. 1 through 2-8, Nov. 19, 1999.
AAPW01 Update Code Maintenance, Jul. 1, 1999, pp. 1-25.
ABC Insurance Company/EngineRoar, pp. 1-2.
Additional Internet Efforts Will Propel Every Segment of Our Business, Free Enterprise, Summer 1999, p. 13.
All Open Orders for Customer No. 218556; Motorola Corporation; Nov. 23, 1999.
ARMS 400 Demonstration, pp. 1-67.
ARMS Claims Internet Quick Reference Guide, Oct. 1999.
ARMS Electronic Callback System Demonstration, pp. 1-22, 1998.
ARMS Overview, pp. 1-10.
ARMS Technology, Jul. 2000.
ARMS/400—Automated Rental Management System, pp. 1-8, 1995.
ARMS/400—ERAC Employee Reference, pp. 1-10.
ARMS/400 Automated Rental Management System, Copyright 1998.
ARMS/400 Automated Rental Management System, Copyright 1999.
ARMS/400 Automated Rental Management System, Version 3, Feb. 1997.
ARMS/400 Main Menu Flow, pp. 1-20.
ARMS/400 Manual.
Arms/400 Training System Document, Nov. 16, 1998.
ARMS/400 Update, Mar. 15, 2000, pp. 1-4.
ARMS/400 Update, pp. 1-7, Jan. 7, 2000.
ARMS/400 Update, pp. 1-6.
ARMS/400 User Manual, 1999.
ARMS/400 User Training, Jul. 2000, pp. 1-26.
ARMS/ECARS Handbook for ARMS/Claims Developers, pp. 1-19.

(56) References Cited

OTHER PUBLICATIONS

ARMS/Web User Training, pp. 1-38, Jul. 18, 2000.
ARMS/Web Using Jacada, Oct. 13, 1999, pp. 1-13.
Automated Rentals, Unwrapped, pp. 1-7, Oct. 1995.
Bluebird Auto Rental Systems, "Are You Buried Under an Evergrowing Mountain of Paper?".
Bluebird Auto Rental Systems, Business Description & Products.
Car Rental Insider, May 1997, pp. 1-4.
CIO Magazine 2002 Enterprise Value Awards Application, pp. 4-10, 2002.
Close Pending Ticket Report (All Tickets pended for 5 days or more), Job #579, DR0018, Apr. 3, 1996, pp. 1-2.
Copyright Chronicle Publishing Company, May 2, 1997, "*Booking a room, vehicle for vacation via the Net*", Pantagraph, C.1.
CST, May 6, 1999, pp. 1-18.
Customer Account Services, AACB45.
D.P. General Use Programs, AACB10 Consolidated Callback Maintenance, Apr. 1994, pp. 1-4.
D.P. General Use Programs, AACM12, ECARS—Special Instructions/Rates/Rate Rules, Jun. 1993, pp. 1-5.
Data Warehouse & Analyzer Quick Sheet, Jun. 2000, pp. 1-2.
Declaration of Timothy Weinstock, which was submitted in the parent U.S. Appl. No. 09/641,820 application and received by the USPTO on Jan. 17, 2006 for the U.S. Appl. No. 09/641,820 parent application.
Dollar Rent A Car Systems, Inc., pp. 1-5, 1998.
ECARS—Enterprise Computer Assisted Rental System, AACJ01 Callbacks, pp. 1-9, Jul. 1, 1997.
ECARS 2000 Customer Profile, Chapters 1-16.
ECARS Backdated Ticket Report, Job #043/DR0099, Mar. 1996, pp. 1-2.
Edlund, Al, "How Thin Clients Lead to Fat Networks", Business Communications Review, Jul. 1998, pp. 28-31.
eINFO, Data Warehouse, Oct. 1999.
Email exchange between Ken Keller and David Smith, Jun. 4, 1997.
Email from Angela Babin, Jun. 22, 1999, single page.
EngineRoar.com, pp. 3-76.
Enterprise Computer Assisted Rental System Workbook, Dec. 1996.
Enterprise Computer Assisted Rental System Workbook, Sep. 1997.
Enterprise Network and Physical Connections Overview, 1995, pp. 1-5.
Enterprise Rent-A-Car ARMS—Vehicle Messaging System, Project Charter, Oct. 15, 1998, pp. 1-7.
Enterprise Rent-A-Car Company ARMS—Vehicle Messaging System Overview, May 16, 2001, pp. 1-35.
Enterprise Rent-A-Car Company ARMS—Vehicle Messaging System Phase II Project Charter, Aug. 20, 1999, pp. 1-6.
Enterprise Rent-A-Car Company, AACM27/AACM28, Overview, pp. 1-8, Nov. 22, 1999.
Enterprise Rent-A-Car Company, ARMS Basics and Concepts, vol. 1, Chapters 1-4, Feb. 24, 1998.
Enterprise Rent-A-Car Company, ARMS Basics and Concepts, vol. 1, Chapters 1-4, Jun. 10, 1998.
Enterprise Rent-A-Car Company, ARMS Technical Document (ATD Internal), pp. 1-40, Aug. 2, 1993.
Enterprise Rent-A-Car Company, ARMS, Automated Rental Management System, pp. 1-36.
Enterprise Rent-A-Car Company, Automated Rental Management System (ARMS), Version 1, Apr. 12, 1993.
Enterprise Rent-A-Car Company, Automated Rental Management System (ARMS), Version 1.1, Jan. 5, 1994.
Enterprise Rent-A-Car Company, ECARS Workbook, Dec. 1996.
Enterprise Rent-A-Car Company, Functional Specification, pp. 1-2, Nov. 1999.
Enterprise Rent-A-Car Customer Profile Data Form, pp. 1-14.
Enterprise Rent-A-Car Rental Application Development and Support Project Request, Jul. 12, 1999, pp. 1-3.
Enterprise Rent-A-Car, ARMS Online Reporting, Project Charter, Version 1.0, Aug. 20, 1999, pp. 1-7.
Enterprise Rent-A-Car Rental Application Development and Support Project Request, Jul. 6, 1999, pp. 1-2.
Everything You Need to Know About ARMS Automotive, 2000, pp. 1-8.
Future State Summary, Jun. 1999, pp. 1-8.
GUI ARMS/400 Development Project Approach.
GUI ARMS/400 Development, pp. 1-2, 1999.
http://www.eautoclaims.com, pp. 1-11, Apr. 8, 2000.
http://www.hertz.com/InteractionRes/htm/isexckge.htm, pp. 1-2, Mar. 20, 1997.
Information on Hertz Corporation; Sep. 24, 2002; pp. 1-61.
Interactions, "Electronic Connections", p. 3, Mar. 15, 1995.
Interactions, ARMS Update, vol. 6, Issue 2, Feb. 1997.
Interactions, ARMS, vol. 3, No. 6, Mar. 15, 1994.
Interactions, Published especially for our Farmers adjusters, 1994.
Interactions, Special Edition, Nov. 1992.
Interactions, Special Edition, vol. 1, No. 4, Aug. 1992.
Interactions, vol. 1, No. 3, Jul. 1992.
Interactions, vol. 1, No. 5, Sep. 1992.
Interactions, vol. 1, No. 8, Dec. 1992.
Interactions, vol. 2, No. 1, Jan. 1993.
Interactions, vol. 2, No. 11, Oct. 1, 1993.
Interactions, vol. 2, No. 13, Nov. 1, 1993.
Interactions, vol. 2, No. 14, Nov. 15, 1993.
Interactions, vol. 2, No. 5, May 1993.
Interactions, vol. 2, No. 7, Jul. 1993.
Interactions, vol. 2, No. 8, Aug. 1993.
Interactions, vol. 3, No. 1, Jan. 1, 1994.
Interactions, vol. 3, No. 1, Jan. 15, 1994.
Interactions, vol. 3, No. 10, May 15, 1994.
Interactions, vol. 3, No. 11, Jun. 1, 1994.
Interactions, vol. 3, No. 12, Jun. 15, 1994.
Interactions, vol. 3, No. 14, Jul. 15, 1994.
Interactions, vol. 3, No. 15, Aug. 1, 1994.
Interactions, vol. 3, No. 16, Aug. 15, 1994.
Interactions, vol. 3, No. 21, Nov. 1, 1994.
Interactions, vol. 3, No. 23, Dec. 1, 1994.
Interactions, vol. 3, No. 8, Apr. 15, 1994.
Interactions, vol. 4, Issue 14, Jul. 15, 1995
Interactions, vol. 4, Issue 16, Aug. 15, 1995.
Interactions, vol. 4, Issue 19, Oct. 1, 1995.
Interactions, vol. 4, Issue 21, Nov. 1, 1995.
Interactions, vol. 4, Issue 24, Dec. 15, 1995.
Interactions, vol. 4, No. 3, Feb. 1, 1995.
Interactions, vol. 4, No. 6, Mar. 15, 1995.
Interactions, vol. 4, No. 9, May 1, 1995.
Interactions, vol. 5, Issue 1, Jan. 1, 1996.
Interactions, vol. 5, Issue 13, Oct. 1, 1996.
Interactions, vol. 5, Issue 14, Nov. 1, 1996.
Interactions, vol. 5, Issue 2, Jan. 15, 1996.
Interactions, vol. 5, Issue 4, Feb. 15, 1996.
Interactions, vol. 6, Issue 12, Dec. 1997.
Interactions, vol. 6, Issue 8, Aug. 1997.
Interactions, vol. 7, Issue 1, Jan. 1998.
Interactions, vol. 7, Issue 12, Dec. 1998.
Interactions, vol. 7, Issue 5, May 1998.
Interactions, vol. 7, Issue 7, Jul. 1998.
Interactions, vol. 7, Issue 8, Aug. 1998.
Interactions, vol. 8, Issue 7, Jul. 1999.
Interactions, vol. 8, Issue 8, Aug. 1999.
Interactions, vol. 8, Issue 9, Sep. 1999.
Interactions, vol. 9, Issue 2, Feb. 2000.
Interactions, vol. 9, Issue 3, Mar. 2000.
Interactions, vol. 9, Issue 5, May 2000.
Internet Networking Architecture, 1999.
Interoffice Memorandum re ARMS OUTLINE, Oct. 7, 1999, pp. 1-2.
Introducing ARMS Claims, Jun. 2000, pp. 1-6.
IS General Use Programs—Section 15, AACB40, Overview, pp. 1-16, Jun. 22, 2000.
IS General Use Programs—Section 19, AACB34 Callback Fax Customization, Mar. 5, 1998.
Jacada Implementation Methodology, pp. 1-10, May 12, 1999.
Jacada, Chicago Executive Briefing, Nov. 4, 1999, pp. 1-13.

(56) References Cited

OTHER PUBLICATIONS

Kenyon, Stephanie, "20 Tips for an Effective Web Site", ASTA Agency Management, Jan. 1999.
King, Jeff and Estes, Steve, Enterprise Rent-A-Car ARMS Web-enabled Management Reporting System Initial Project Analysis & Options, Jul. 23, 1999, pp. 1-7.
Lone Star Rental Systems, EZ Traker™, Your Complete Auto Rental Management Solution.
Lorentz, Jeff, Functional Specification, Internet Application Development, ARMS Automotive, pp. 1-3.
Marino, Donna, "Internet Experts Urge Development of E-Commerce Models", ASTA Agency Management, Jan. 1999, pp. 32-34.
McKeown, Rosemary, "The Right Computer System Adds to Your Revenue", Computer Systems, pp. 1-4.
Memorandum re Sabre Meeting, Rob Hibbard to Scott Shuler, Sep. 21, 1998.
Milligan, Michael, "OTA targets mid-January to release e-commerce protocol", Travel Weekly, Jan. 10, 2000.
Net rentacar.com User Guide, pp. 1-19.
Open Travel Alliance, "ebXML Uses Opentravel Alliance Specification for Early Tests", May 10, 2000.
Open Travel Alliance, "Open Travel Alliance Joins Forces with DISA", Sep. 9, 1999.
Open Travel Alliance, "Open Travel Alliance Names Board Officers", Sep. 2, 1999.
Open Travel Alliance, "OpenTravel Alliance's New XML Specification Creates a Common Customer Profile for Travelers", Feb. 29, 2000.
Open Travel Alliance, "White Paper", pp. 1-20, Feb. 2000.
Orion Systems, Ltd., pp. 1-36.
Orion Systems, Ltd., System Overview and Handheld Terminals, downloaded from www.orsys.com on Dec. 1, 1997, pp. 1-5.
Orion Systems, Ltd., System Overview with Screens and Reports, May 1996.
Our Packages Come in All Sizes!, Nov. 1999, pp. 1-2.
PC/ARMS Demonstration, pp. 1-45, 1995.
PGMR, ECARS—Enterprise Computer Assisted Rental System, pp. 1-4.
Planning and Managing a Project, Version 5.3, CST Catalog UG-184-1198, 1st Ed., Nov. 1998, pp. 1-90.
Preview Travel, Inc., Car Reservations, 1999.
Rental 101, pp. 1-30.
Rental Redesign Requirements—Contract Process, pp. 1-5, Feb. 16, 2000.
Rental Redesign Requirements Contract, pp. 1-56, Feb. 15, 2000.
Rental Redesign, Rental Management, RMS (Rental Management Services), Sep. 30, 1998, pp. 1-2.
Rosen, Cheryl, "OTA Debuts Data Protocol", Business Travel News, Jan. 10, 2000.
Rosen, Cheryl, "OTA Publishes XML Data Standard", Business Travel News, pp. 1-2, Mar. 20, 2000.
The ARMS Connection, Safeco/Enterprise Rent-A-Car, pp. 1-4.
The Connection, State Farm Insurance/Enterprise Rent-A-Car, Rental Process Automation and Procedures, pp. 1-3.
The Hertz Corporation, 1998.
The Jacada User Guide: Jacada for Java, Version 6.0, CST Catalog UG-213-0799, 1st Ed., Jul. 1999.
TSD Brochure, "Are You Comparing Apples to Apples When Choosing Rental Software", pp. 1-3.
TSD Brochure, Rent 2000 from TSD, Rental Management Software, Revolutionize the Way You Do Business with the Proven Solution, pp. 1-2.
TSD Brochure, Rent 2000 from TSD, Rental Management Software, Revolutionize the Way You Do Business, pp. 1-29.
Warner, Fara, "Car Race in Cyberspace".
Weinstock, Tim, ARMS/Web is Coming, pp. 1-2, Aug. 13, 1999.
Welcome to ARMS/400, New York State Rollout and Implementation Session, Oct. 28, 1999, pp. 1-51.
Welcome to the Data Warehouse, Jun. 2000, pp. 1-2.
Welcome to the Hertz Interactive Reservation Process; Mar. 3, 2000; pp. 62-27.
Collision Industry Electronic Commerce Association Business Message Specification Schema, Jul. 30, 2003.
"Rental Management Remittance Advice for Vehicle Replacement Rentals", National Electronic Data Interchange Transaction Set Implementation Guide, 820, Jul. 2000.
"Rental Management Invoicing and Application Advice for Vehicle Replacement Rentals", National Electronic Data Interchange Transaction Set Implementation Guide, 811/824, Jul. 2000.
"Rental Management for Vehicle Replacement Rentals", National Electronic Data Interchange Transaction Set Implementation Guide, 272/824, Jul. 2000.
"ARMS Automotive Web Service Process Overview", 8 pages, 2004.
"Fix Auto WEB-CMS Repair Delay Form", 3 pages, 2004.
Decision on Appeal for U.S. Appl. No. 09/694,050 dated Jun. 1, 2010.
Interview Summary for U.S. Appl. No. 09/641,820 dated Oct. 18, 2006.
Interview Summary for U.S. Appl. No. 09/641,820 dated Oct. 20, 2003.
Interview Summary for U.S. Appl. No. 09/694,050 dated Dec. 30, 2002.
Interview Summary for U.S. Appl. No. 09/694,050 dated Jan. 21, 2005.
Interview Summary for U.S. Appl. No. 09/694,050 dated Jul. 10, 2002.
Interview Summary for U.S. Appl. No. 09/694,050 dated Jun. 12, 2003.
Interview Summary for U.S. Appl. No. 09/694,050 dated Sep. 14, 2004.
Notice of Allowance for U.S. Appl. No. 09/641,820 dated Mar. 31, 2005.
Notice of Allowance for U.S. Appl. No. 09/641,820 dated May 7, 2003.
Notice of Allowance for U.S. Appl. No. 09/641,820 dated Oct. 12, 2005.
Notice of Allowance for U.S. Appl. No. 09/641,820 dated Oct. 18, 2006.
Notice of Allowance for U.S. Appl. No. 09/694,050 dated Sep. 30, 2010.
Office Action for U.S. Appl. No. 09/641,820 dated Apr. 15, 2003.
Office Action for U.S. Appl. No. 09/641,820 dated Aug. 24, 2006.
Office Action for U.S. Appl. No. 09/641,820 dated May 2, 2006.
Office Action for U.S. Appl. No. 11/747,645 dated Aug. 27, 2010.
Office Action for U.S. Appl. No. 11/823,782 dated Feb. 17, 2011.
Office Action for U.S. Appl. No. 11/868,266 dated Sep. 30, 2010.
Office Action for U.S. Appl. No. 11/929,277 dated Oct. 12, 2010.
Office Action for U.S. Appl. No. 11/929,350 dated Feb. 7, 2011.
Office Action for U.S. Appl. No. 11/929,473 dated Oct. 12, 2010.
Office Action for U.S. Appl. No. 12/178,037 dated Nov. 17, 2010.
Office Action for U.S. Appl. No. 12/179,071 dated Sep. 14, 2010.
Response to Office Action for U.S. Appl. No. 09/641,820 dated Aug. 21, 2003.
Response to Office Action for U.S. Appl. No. 09/641,820 dated Jan. 12, 2006.
Response to Office Action for U.S. Appl. No. 09/641,820 dated May 22, 2006.
Response to Office Action for U.S. Appl. No. 09/641,820 dated Oct. 29, 2003.
Response to Office Action for U.S. Appl. No. 09/694,050 dated Apr. 28, 2003.
Response to Office Action for U.S. Appl. No. 09/694,050 dated Dec. 10, 2004.
Response to Office Action for U.S. Appl. No. 09/694,050 dated Dec. 22, 2006.
Response to Office Action for U.S. Appl. No. 09/694,050 dated Jul. 29, 2002.
Response to Office Action for U.S. Appl. No. 09/694,050 dated Jul. 9, 2002.
Response to Office Action for U.S. Appl. No. 09/694,050 dated Jun. 25, 2003.
Response to Office Action for U.S. Appl. No. 09/694,050 dated Mar. 30, 2004.

(56) References Cited

OTHER PUBLICATIONS

Response to Office Action for U.S. Appl. No. 09/694,050 dated Mar. 31, 2003.
"Thrifty Introduces Automated Car Rental Centers", PRNEWSWIRE, Jul. 20, 1994.
Office Action for U.S. Appl. No. 11/881,216 dated Sep. 28, 2011.
Office Action for U.S. Appl. No. 11/881,383 dated Sep. 6, 2011.
Office Action for U.S. Appl. No. 11/929,277 dated Aug. 18, 2011.
Office Action for U.S. Appl. No. 11/929,350 dated Aug. 30, 2011.
Office Action for U.S. Appl. No. 12/178,037 dated Jul. 29, 2011.
Prosecution History for U.S. Appl. No. 10/343,576, filed Jan. 31, 2003—Parts 1-3 (as of Nov. 29, 2011).
Prosecution History for U.S. Appl. No. 11/550,614, filed Oct. 18, 2006 (as of Nov. 29, 2011).
Prosecution History for U.S. Appl. No. 11/609,844, filed Dec. 12, 2006 (as of Nov. 29, 2011).
Prosecution History for U.S. Appl. No. 11/747,645, filed May 11, 2007 (as of Nov. 29, 2011).
Prosecution History for U.S. Appl. No. 11/823,782, filed Jun. 28, 2007—Parts 1-2 (as of Nov. 29, 2011).
Prosecution History for U.S. Appl. No. 11/868,266, filed Oct. 5, 2007 (as of Nov. 29, 2011).
Prosecution History for U.S. Appl. No. 12/179,071, filed Jul. 24, 2008 (as of Nov. 29, 2011).
Response to Office Action for CA Application 2416840 dated Sep. 3, 2010.
Response to Office Action for U.S. Appl. No. 11/929,277 dated Oct. 12, 2010.
Response to Office Action for U.S. Appl. No. 11/929,350 dated Feb. 7, 2011.
Response to Office Action for AU 2005255376 dated Aug. 5, 2011.
Notice of Acceptance for AU 2005255376 dated Aug. 17, 2011.
Notice of Allowance for U.S. Appl. No. 11/747,645 dated Dec. 28, 2011.
Notice of Allowance for U.S. Appl. No. 12/179,071 dated Dec. 30, 2011.
Saha, "Application Framework for e-business: Portals", Internet Citation, Nov. 1999, XP002276158, Retrieved from the Internet: URL: ftp://www6.softwarejbm.com/software/developer/library/portals.pdf, Retrieved on Apr. 5, 2004.
Schlosser, "IBM Application Framework for e-business: Security", Internet Citation, Nov. 1999, XP002257288, Retrieved from the Internet: URL:ftp://www6.software.ibm.com/software/developer/library/security.pdf, Retrieved on Sep. 12, 1999.
Office Action for U.S. Appl. No. 13/025,617 dated Apr. 27, 2012.
Response to Office Action for U.S. Appl. No. 11/823,782 dated Feb. 17, 2011.
Response to Office Action for U.S. Appl. No. 11/881,216 dated Sep. 28, 2011.
Response to Office Action for U.S. Appl. No. 11/881,383 dated Sep. 6, 2011.
Response to Office Action for U.S. Appl. No. 11/929,277 dated Aug. 18, 2011.
Response to Office Action for U.S. Appl. No. 11/929,350 dated Aug. 30, 2011.
Office Action for EP Application 05770847.1 dated Jun. 19, 2012.
Notice of Allowance for U.S. Appl. No. 13/025,546 dated Jun. 25, 2012.
Office Action for CA Application 2567740 dated Aug. 15, 2013.

* cited by examiner

BUSINESS TO BUSINESS COMPUTER SYSTEM FOR COMMUNICATING AND PROCESSING RENTAL CAR RESERVATIONS USING WEB SERVICES

CROSS REFERENCE TO RELATED APPLICATIONS

This application is a continuation-in-part of patent application Ser. No. 10/343,576, filed Jan. 31, 2003, published as U.S. Pat. App Pub 2005/0021378, now U.S. Pat. No. 8,374, 894, which is a national phase of PCT application serial number PCT/US01/51437, published as WO 2002/067175, and a continuation-in-part of patent application Ser. No. 09/694,050, filed Oct. 20, 2000, now U.S. Pat. No. 7,899,690, which is a continuation-in-part of patent application Ser. No. 09/641,820, filed Aug. 18, 2000, now U.S. Pat. No. 7,275, 038, the disclosures of all of which are incorporated herein by reference.

This application is also a continuation-in-part of patent application Ser. No. 10/028,073, filed Dec. 26, 2001, published as U.S. Pat. App Pub 2003/0125992, which is a continuation-in-part of PCT application serial number PCT/US01/51437, published as WO 2002/067175, filed Oct. 19, 2001, which is a continuation-in-part of patent application Ser. No. 09/694,050, filed Oct. 20, 2000, now U.S. Pat. No. 7,899,690, which is a continuation-in-part of patent application Ser. No. 09/641,820, filed Aug. 18, 2000, now U.S. Pat. No. 7,275,038, the disclosures of all of which are incorporated herein by reference.

FIELD OF THE INVENTION

The present invention relates generally to the field of electronically communicating and processing rental vehicle reservations between a first business organization and a second business organization.

BACKGROUND AND SUMMARY OF THE INVENTION

The parent filings described in greater detail below describe numerous groundbreaking, novel, and industry-honored inventions that improve the degree of connectivity and functionality shared by a rental car service provider and its business partners, particularly high volume business partners such as insurance companies that place high volume orders for rental vehicles with the rental car service provider as part of the replacement car rental industry. See Berkman, E., "How to Stay Ahead of the Curve", CIO Magazine, Feb. 1, 2002 (bestowing a technology award on the parent invention recognizing the parent invention's innovative value), the disclosure of which is incorporated herein by reference.

Computer technology has been embraced by many businesses in order to handle their ever increasing order flow as well as to mitigate the increasing blizzard of paper required to be produced to document this business. A significant benefit which often drives the implementation of technology is its further advantage in increasing productivity to thereby allow fewer people to handle greater volumes of business. One such good example demonstrating the efficiencies and value to be gained by implementing technology is the business model developed and followed by the assignee of the present invention. A rental car company at its heart, the assignee transacts an ever increasing number of time sensitive, relatively low dollar volume, vehicle rentals which in many instances require authorizations to be made in advance, reservations of vehicles from available geographic and vehicle type selections, monitoring of the rental as it progresses including possibly extending the rental under certain circumstances, communications between the various parties involved in the transaction to ensure ultimate customer satisfaction, and financial accounting for the transaction including generating invoices and processing them for payment. While a significant portion of the vehicle rental business involves rental for leisure, business travel, etc., another significant business relationship has developed with insurance companies and the like in what has been termed as the replacement car rental service business. In this business, a vehicle insurance company may have many thousands of policyholders who are eligible to be involved in accidents, and other dislocations of use, requiring that a vehicle be rented for that customer's use while his own vehicle be made ready again for use. Thus, for this business segment, a multi-tiered business organization such as a vehicle insurance company represents a significant customer for repetitive vehicle rental services. To conduct this business in an orderly, time efficient and cost efficient manner, it is necessary that this insurance company has as its business partner a vehicle rental company which is itself multi-tiered, such as the assignee of the present invention. This is because the needs, both geographically and in volume, are significant which require the dedication of a significant amount of resources. To satisfy these needs and to respond to other business growth, in its embrace of technology the assignee hereof has succeeded in developing an in-house computer system and related software which has integrated its business internally. This business integration has been massive and company-wide as is needed to integrate a company having a central office with literally thousands of individual branches located nationally, and even now internationally, with hundreds of thousands of vehicles available for rental. Furthermore, other business partners including other service providers such as vehicle repair shops have also been given access to this system to allow for input of information relating to progress of vehicle repair, extension of rental time, etc. as the rental progresses. This integrated business computer network and software generally includes a mainframe server at the heart of a wide area network (WAN) which facilitates the transfer of vehicle rental information and orders company-wide. This integrated business model is most efficient and needed in order to satisfy the vehicle rental service needs of a vehicle insurance company which itself may be national or even international in scope.

As a first step in extending the integration of technology into this business model, the present assignee has previously developed and implemented a computer system which has provided improved communication capabilities between the two business partners. This system generally comprised a second mainframe computer linked to the first mainframe of the integrated business network, with dedicated access lines being provided from this second mainframe to various levels of the multilevel business organization comprising the insurance company. In effect, with this additional mainframe and dedicated pipeline access, various individuals at the insurance company were permitted to directly interact with the integrated business computer network of the vehicle rental company as well as other selected service providers such as body shops where wrecked vehicles were being repaired. The implementation of this system provided a great step forward over the people intensive business activity previously required in order to handle the large number of transactions encountered in this business relationship. Historically, the replacement car market engendered large numbers of telephone calls being placed between the insurance company, the rental company, and the body shop where vehicle repair was being performed in order to authorize the rental, select and secure the desired replacement vehicle to be provided, monitor the progress of the repair work so that scheduling of the rental vehicle could be controlled, extending the vehicle rental in the event of delays in repair, authorizing various activities involved in the rental process including upgrades of vehicles or other charges for services, and subsequent billing of the rental service and processing the billing to the insurance company for payment.

While the implementation of this system was successful and represented a tremendous step forward in automating the business relationship between the insurance company and the vehicle rental company, it did have certain limitations. For example, a specific communication link had to be established between the rental vehicle company and the particular users at the insurance company designated to have access to this system. Thus, special attention and some modicum of expense was required to establish these "pipelines" and maintain them. Still another aspect to the system implemented was that it was not "browser" based nor did it provide graphical user interface (GUI) menus. Thus, each user had to be specifically trained in the particular "language" used by the system and learn to work with specific menus nested in a specific manner as well as codes for entering commands which were not similar to other computer software programs. This software design thus necessarily required additional training in order to insure that users could gain the full measure of advantage provided by the system and in order to minimize the opportunity for erroneous information or incorrect reservations from being entered or otherwise confusing the business transactions. Furthermore, user efficiency was not immediate and required skill beyond that ordinarily found in casual computer users, as we are all becoming in this computer age. Still another disadvantage to the system was that access was required to a designated entry point in the system in order for a person authorized to be on the system to work with it. As the nature of the insurance and replacement car business requires extreme mobility at multiple levels of both business partners, this represents a limitation to the usefulness and time efficiency with which various business functions could be performed. Therefore, while implementation of the second mainframe allowing for pipeline connections at various levels of the multi-tiered insurance company was a significant step forward in automating the business relationship between the two business partners, significant limitations to this solution were readily apparent to the users thereof.

In the first parent application cross-referenced above, the inventors herein have previously succeeded in designing and developing a means for substantially enhancing the business to business communication link between these two businesses which provide significant advantages over its prior embodiment. More particularly, the inventors have succeeded in replacing the dedicated pipeline access of the existing system with a web portal allowing Internet access to the mainframe with a browser based graphical user interface (GUI) presentation. This also made the system more readily accessible to smaller business partners as the expense of the "pipeline" was eliminated. The first parent's invention offers several important technical advantages over the previous system. First of all, by taking advantage of the ubiquitous nature of the Internet, the ultimate in portability and connectivity for this system is now provided in a business environment where mobility and connectivity are at a premium. In other words, a claims adjuster, body shop, or any other business employee authorized to have access to the system may gain access at any site offering Internet access. In present day technology that includes many mobile devices and appliances which are Internet enabled. As technology advances, it is conceivable that this access will extend to permit "24/7" access by any authorized person at any geographic location. This is a marked improvement providing immediate benefit and advantage over the dedicated pipeline access of the prior art system.

One limitation however, is that with this embodiment, this internet access must support a stateful connection. In this context, a stateful connection refers to a "persistent" conversation, meaning that the client side and server side software components establish a connection to one anther once and multiple data transfers may occur without severing that connection. Common examples of a stateful connection include on-line chat, on-line gaming, and for virtually all on-line conferencing. This is distinguishable from the normal operation of web pages which typically establish a connection, transfer the object on the page, and then sever that connection. These types of connections are generally referred to as "stateless" connections.

A second major advantage of the first parent's invention is its graphical user interface. The inventors have taken full advantage of this browser based GUI to streamline and organize the presentation of information to a user to actually guide him as he interacts in doing his business. One such example is customized design of the menus such that the user is guided and directed to answer only those questions required to be answered in order to conduct the particular transaction being addressed, and further to present choices to the user for his selection to minimize the need for the user to rely on his own memory or to be familiar with complicated and specialized codes to enter data or request transaction activity. With the recent and continuing explosion of the Internet, more people are becoming familiar with browser programs and their operation through their own daily activities in their personal lives. This familiarity paves the way for easier training and quicker orientation of a new user to the present invention. For large business organizations communicating at multiple levels, this significant advantage cannot be minimized as there are large numbers of people who must be continuously trained due to the growth of the organizations, as well as the replacement of employees due to the inevitable attrition. Thus, the first parent's invention provides an immediate increase in worker productivity, and makes that improved efficiency available to many more workers who are not particularly skilled otherwise in computer usage.

Still another advantage provided by the first parent's invention is through the implementation of additional functionalities which are engendered by the browser/GUI interface. As the system is continuously used, and feedback is continuously monitored and analyzed, additional features that add value through providing management information as well as by speeding transaction activity over the system may be implemented. For example, several of these features include the ability of a user to create an on demand report for transaction activity including summaries of transactions handled by a particular user or group of users which might either be open or closed. Another example of additional functionality which improves the efficiency of a user is the ability to create a repair facility call back list which allows a user to sort existing open vehicle rental reservations by repair facility (body shop) and date such that a user is presented with the list of open reservations at a particular repair facility which can be readily handled in a single telephone call while at the same time having the system on line to implement any needed changes such as extensions of reservations, etc. Additional functionality has also been provided to speed the processing of invoicing which of course also speeds their payment and cash receipts. For example, it was found that even despite the built-in error checking and correction facilities provided to the users of the system, a repetitive pattern of mistakes involving incorrect claim numbers was discovered. To speed the processing of these, an additional functionality was provided as an "electronic audit" known as invoice return which returns an invoice to a particular adjuster upon detection of an incorrect claim number for his human intervention and correction of the claim number. In this manner, problem invoices exhibiting one of the most common problems encountered may be readily handled within the system and in an efficient manner, instead of manually as before.

The first parent's invention also has as a significant advantage the ability to be further customized to meet the individual business partners' needs and desires as well as to provide additional functionality by offering additional features which become desirable upon accumulation of user data based on user experience. Furthermore, once implemented, they are immediately available system wide. While this allows for consistent usage, it is limited in the sense that all of the system users are forced to use the same menus, data definitions, etc. This is not seen as a limitation for the one-to-one business application intended to be primarily addressed by the first parent's invention.

Still another advantage of the first parent's invention is that the graphical user interface incorporates point and click interaction, using buttons and tabs to present or conceal data for the user's attention or inattention as the case may be, and provide a much more robust interaction capability through the creation of menu designs that allow for access to the most commonly needed features from any point in the menu architecture. This is to be contrasted with the prior system which consisted of a main frame character based interface while the first parent's invention with its GUI interface allows a user to point and click to navigate and to make selections by pull down selection, thereby reducing errors. As users become more experienced with the system, and their confidence level grows, they are much more likely to become bored and aggravated with the rigid structure of the prior system requiring them to follow along a certain menu architecture in order to complete certain tasks. On the other hand, the first parent's invention generally increases the interest of the user in using the system. These advantages of the first parent's invention over the prior interface promote employee productivity by allowing a user more control over his work which is critical in achieving savings in human resources to operate the system which is one of its main goals.

The second parent's invention extends the first parent's invention and expands its capabilities and functionalities. With the second parent's invention, a user may not only have access to its business partner, but also one or more competitors of its business partner through the same Internet portal. In this way, at least two needs are satisfied. First, the user can have access to a variety of providers to choose from where business needs or desires require. This allows the user to use a single portal and not have to sign on to a number of different portals, even should they be available. Furthermore, the user isn't troubled to learn how to access and use different portals even should they be available. Presently, not all providers are operating an Internet portal for offering their services, so by allowing business competitors to be accessible through the same portal, independent development of other portals is forestalled. This is a benefit to the operator of the main portal as it creates and maintains a competitive advantage by handling all of the order flow which creates a data base of useful information for marketing purposes. Although initially the portal services might be offered for no additional cost to a competitor, eventually a fee might be charged which would at least partially offset the cost for owning and operating the portal.

The design of the portal is elegant and offers great flexibility for customizing not only the menus for presentation to the user, but also in the design of the data base entries needed or desired by the user and/or the competitive provider. For example, some users might not know or care about the features of a vehicle rented and so those data entries may not be provided space on the menu for the user to fill in. The data base as handled by the networked computer system then need not keep track of that data for that customer. This feature is readily accommodated by the data base programming and is conveniently implemented.

In still another aspect of the second parent's invention, the web portal has the capability to accommodate the varying data requirements also of the various competitive providers, but also the level of their sophistication as evidenced in their respective computer systems and interface facilities. For example, the web portal may be configured to communicate the user's order to the competitive provider via email, phone, or even through a connection directly to an integrated computer system having the same or substantially the same interoperability as the integrated computer system of the assignee hereof. This capability extends to accommodating and matching the competing data requirements of the user and the competitive providers, and having the flexibility to design and implement menus that readily meet these competing needs. Furthermore, the second parent's invention allows for changes to be implemented by simple re-programming of the web portal which minimizes the effort and enhances the "user friendly" aspect to the present invention.

Not only are these "global" improvements made available with the second parent's invention, there are other more particularized improvements that add functionality within the operating framework of the second parent's invention. For example, one such improvement is the ability to "virtually" assign work groups within the user so that, for example, multiple adjusters might be made into a team with a shared work load so that all of the team members have access to the same pool of work, such as the placing of reservations for the same group of drivers. With this "virtual team" assignment capability, work groups may be readily re-assigned to match changing work loads without worrying about re-configuring hardware or internal network connections. This can be a very valuable feature to accommodate staffing issues over geographical distances that can be nationwide, with access through the web portal to reservation facilities which are themselves nationwide.

Still another feature is the ability to customize an individual user's authorization limits. As can be appreciated, one of the mixed blessings of providing enhanced functionality to the individual users of any integrated computer system is that it places great power in the hands of the user which at the same time creates the potential for abuse. There have been well publicized instances of "rogue" employees making financial decisions or placing instructions which have far reaching financial consequences well beyond the intended authority of an employee, with disastrous results. With the second parent's invention, one feature is the ability to limit the financial commitments that a user may make during any pre-selected time period. For example, the user's profile may limit his ability to make only a certain dollar limit of vehicle reservations over any certain number of work days. In this way, added safe guards may be conveniently provided, monitored by reporting capabilities, and changed as circumstances warrant, all with simple programming changes at the web portal.

There are still other features that are provided by the second parent's invention that find their genesis in the different approach taken over the first parent's invention and owing to the inherent increased flexibility of using a web based programming for the web portal to interface between the user and the providers on the web server and eliminating the need for any custom software on the user's terminal. The details of these are to be found and described in the detailed description of the preferred embodiment below. Examples include the ability to send confirmatory communications to the user that the reservation has been received and entered into the provider's system for fulfillment, custom report design including the capability to save and re-generate the custom report upon user command, increased flexibility to process and pay invoices, etc.

Parent PCT application PCT/US01/51437 and its corresponding national phase application disclose additional advantages and features that have been developed and are newly disclosed and claimed more particularly therein. These advantages and features relate to usage of the parent inventions both domestically and abroad where there are idiosyncrasies in the business model that need to be accommodated. Still other features of parent PCT application PCT/US01/51437 and its corresponding national phase application provide entirely new functionality. One such new feature involves adapting the parent inventions as a tool to market replacement vehicles for sale or lease to a customer who has had an accident significant enough that repair of his vehicle is not economically feasible. This is commonly referred to as "totaling" a vehicle. The insurance industry totals about 3 million cars per year, of which approximately 17% are newer models (defined as within three years of current model year). Once totaled, the owner needs to buy another car. Since car rental companies desire to sell more cars, any opportunity to tap into the total loss market will be bountiful.

The invention of the parent PCT application PCT/US01/51437 and its corresponding national phase application provides a window into the establishment of a total loss for a renter's/insured's/claimant's automobile. Any car that is deemed to be a total loss would be indicated as such in the parent invention for reporting purposes. At this point the stored information could be used to help provide economic benefit to all parties, insurance company, rental car company, and automobile owner.

Once a renter's/insured's/claimant's (owner's) car is determined to be a total loss the adjuster will try to ascertain the actual cash value (ACV) to be settled with the owner. The adjuster can use a third party tool, such as CCC's Pathways® product, to determine what ACV is. Today an adjuster must input this information manually into a separate application. The parent invention contains much of the necessary information needed to determine ACV: name, car make, model series, year. The parent invention need merely send the necessary information electronically to a total loss product and request an electronic response. Once the necessary information is generated, the parent invention would in turn take the ACV and cross reference the car rental database of inventory. Necessary information might include but not be limited to: ACV, year, make, model series, comparable cars, etc.

The car rental inventory can be filtered by geography and "holding requirements". As a reseller of vehicles, the car rental inventory is generally contractually required to be within the fleet as a rental for a predetermined amount of time prior to being available for sale to third parties. Once a car is past the holding requirement it is generally within the discretion of the car rental company to sell. Thus, instead of X % of cars available to the car rental company for retail sale, a virtual inventory of cars is available for retail sale to the owner of the car.

Once the filters for geography and holding requirements are active, the parent invention delivers a list of available vehicles for sale. At this point the adjuster and owner review the available cars, decide the cars considered to be attractive, and the owner then decides which one he wishes to purchase.

The user then selects one or more potential vehicles and sends the request to the appropriate car rental location. The car rental location can then contact the owner of the vehicle to buy one of the selected vehicles. In addition, the list of vehicles and ACV information can be sent to the owner for further review and discussion.

Once the car rental company contacts the owner and comes to a sufficient conclusion, either to buy or not to buy, the adjuster is notified of the conclusion and the transaction is consummated either through the parent invention or off-line.

Still other features disclosed in the parent PCT application PCT/US01/51437 and its corresponding national phase application include the following. One such feature is providing for automatic extensions of existing rental authorization, so that some limited extension authority is granted to permit some flexibility to a particular user without burdening him with the need to obtain approval for the extension. Another feature could be referred to offline usage, and provides the functional advantage of permitting processing of reservation data in a computer not connected into the network, and then uploading/downloading between the offline computer as it is connected into the network, such as by dialing into the network over the internet, or through a portal. The type of data which could be processed includes virtually any related to the processing of vehicle rental transactions and other related data such as car repair scheduling, etc. This functionality provides an extension of the usability of the invention to mobile users who travel beyond the reach of the internet, which even further enhances its applicability to those places not covered by wireless coverage. Alternatively, it allows the invention to bypass special connectivity issues which are thought to be disadvantageous for any reason including cost, unavailability, inconvenience, etc. Still another feature includes further integration of the internal data bases kept by permitting a user to automatically update not just one but several data bases with a single command once that new data is entered into a single menu. For example, in what can be referred to as "power templates", a user may enter a multiple number of rental reservations on a single menu and then click a single "approved" icon which would then enter all of them into the system. This represents an improvement over a previous implementation requiring a user to separately "approve" each reservation, and then suffer the system processing time for each reservation. This "batch" processing can result in significant improvement in throughput, and reduction of user interface time for processing multiple transactions. Still another feature provides the added functionality of processing customer satisfaction feedback through the system. This feature provides the capability for a user to enter customer feedback information, both positive and negative but perhaps more importantly negative, so that immediate awareness of any problem can be obtained and corrective action taken to mitigate or eliminate the difficulty. This feature also allows a user to indicate a suggested supervisory level of interaction, or the system may allow for automatic escalation of involvement for succeeding levels of supervisory attention as the dissatisfaction continues or even escalates. This feature can be significant to a service provider as the ultimate success of a service provider is directly dependent on the perception of satisfaction by the end customer. And, it is well known that the sooner a problem is identified and solved, the more likely a customer will have a satisfactory experience. Furthermore, from a strict economic viewpoint, the sooner some problem is addressed and solved, generally the less expensive the solution. A small accommodation can change a frown to a smile, if promptly offered.

Still other features are disclosed in the parent PCT application PCT/US01/51437 and its corresponding national phase application that have applicability perhaps in the domestic business model, but certainly offer needed functionality in other business models found in other countries. One of these includes multiple party involvement/management of a rental transaction. While the flexibility of allowing multiple adjusters within a group to "work on" a rental transaction has been previously described, this particular feature is different in that not only may these multiple adjusters not be within the same group, they might not be employed by the same employer, might not be adjusters themselves, and might have different authority for action on the transaction as is commonly found in different countries. For example, in some countries one adjuster authorizes and manages the rental reservation for the car while another adjuster authorizes and manages the insurance coverage for the rental. Still another feature allows third party or "independent party" management of the rental. In some countries a third party other than an insurance company is involved, such as a "credit hire" or "assist companies" or "repair facility" or "lawyer" or "fleet management company". Each of these third parties, or any other third party, may be permitted access to the system and a user profile created for them that defines their authority to process rental transactions through an administrative profile set up in advance through agreement with the authorizing agent, such as an insurance company. As an enhancement, various individualized features may also provide data indigenous to a particular country, such as electronic access to the Schwackliste book for an adjuster to conveniently view a "class" for a car to determine what replacement vehicle is legally authorized for rental. Still another example of a feature needed to accommodate international capability is a need for a tiered rate system, and an hourly rental charge instead of a daily charge which predominates the domestic market. Processing of electronic signatures to satisfy local custom or legal requirement is yet another example of a feature for which the present invention is uniquely suited to provide.

The invention of parent application Ser. No. 10/028,073 extends the paradigm of GUI, web based, internet connectivity to the integrated software program being utilized by an integrated business to "fulfill" the service/goods requested to be provided by the multi-level user. This, in a sense, closes the loop in adapting the many advantages of this paradigm to an integrated business dealing with sophisticated customers who themselves are integrated, each with multi-level organizations that are best able to utilize the many features, improved efficiencies and cost savings of the present invention. Using the first three parent inventions discussed herein, the communications between user and provider are conducted in GUI, web based, over the internet. Using the Ser. No. 10/028,073 invention, the communications between the employees of the provider and the transacting of the order flow are handled in the same manner. And, as an added advantage of the Ser. No. 10/028,073 invention, the data flow is enhanced as translation issues between varying software is minimized. Furthermore, with this implementation, the fulfillment software program is resident on an application server which may be centrally located, at company headquarters for example, which provides many advantages over prior art non-web based implementations.

In implementing the Ser. No. 10/028,073 invention there are several advantages realized over the prior art non-web based implementations. A first advantage is that the invention is implemented in software that is mainstream and being used in many different applications by others. Consequently, the work of others in extending the connectivity, for example, of a web based browser to other kinds of "input" devices provide a ready extension for the same feature to be added for users to input data/reservations, etc., in the Ser. No. 10/028,073 invention. This facilitates the continuing improvement and upgrading of the system as technology evolves without the significant dedication of resources that would be required when using proprietary technology.

A second advantage is provided by the hardware arrangement which is possible due to the software design. In the prior art system, the software components providing the user interface, the business logic, and the data base storage and access are all contained on a single central processor. For this design, scaling to allow for increased transaction load required that additional central processors be provided and the users segmented in some logical fashion such as geographically, which had operational disadvantages including limiting access to data between geographically segmented users. With the Ser. No. 10/028,073 invention, the software components providing the user interface (GUI), the business logic, and the data may themselves be separated and operated on different hardware allowing them to be individually scaled to accommodate increased transaction load without the limitations of the prior art. In other words, each user accesses the same, scaled data base and hence has access to all data available on the system.

Still other advantages realized parallel those provided by the other parent inventions including the general familiarity of people with web browsers which greatly reduces the training and improves each user's effective use of the program, the generic nature of the code used to implement the program, such as HTML, adds to the flexibility of making changes including hiring and training software programmers to maintain and improve the code to implement new features, and the ready scalability of the paradigm is also important in the business environment enjoyed by the assignee where continual growth in transactions may be readily accommodated merely by adding parallel server processors with minimal communication/switching facility between them.

With the present invention, the inventors herein have further extended the inventive technology of the parent filings such that the inventive system is not only web-enabled, but also web services-enabled. That is, the rental car service provider and its business partners can communicate using web services rather than conventional EDI-based data exchanges or http web screen data exchanges. The use of web services in connection with the present invention allows the rental car service provider and its business partners to seamlessly communicate with each other despite any data formatting differences that may exist between the two entities. Moreover, the use of web services provides the further advantage in flexibility that is available to accommodate changes over time in not only the data types needed for particular web service operations but also the addition of new web service operations to a system.

In a preferred implementation of the present invention, the rental car service provider uses variable format variable length data messages (preferably Extensible Markup Language (XML) documents) as the mode of communication between itself and its business partners. To inform business partners how to transact rental business with the rental car service provider, the rental car service provider preferably makes a web service specification document available to its business partners. The web service specification document describes the types of web service operations available, where on a network to find the web service operations, and the data requirements for successfully communicating with any particular web service operation. These data requirements include both the types of data needed for a web service operation and the format within which that data must be communicated. Once informed of this specification document, business partners can design their computer systems such that outgoing messages to the rental car service provider are formatted in accordance therewith. A web service connector, preferably located on the rental car service provider's computer system, operates to interface web service requests received from business partners with the rental car service provider's backend business logic. Accordingly, when the rental car service provider's computer system receives a message from a web services-enabled business partner, that message can be efficiently processed, as described herein.

While the principal advantages and features of the invention have been discussed above, a greater understanding of the invention including a fuller description of its other advantages and features may be attained by referring to the drawings and the detailed description of the preferred embodiment which follow.

DETAILED DESCRIPTION OF THE PREFERRED EMBODIMENT

Figure 1:
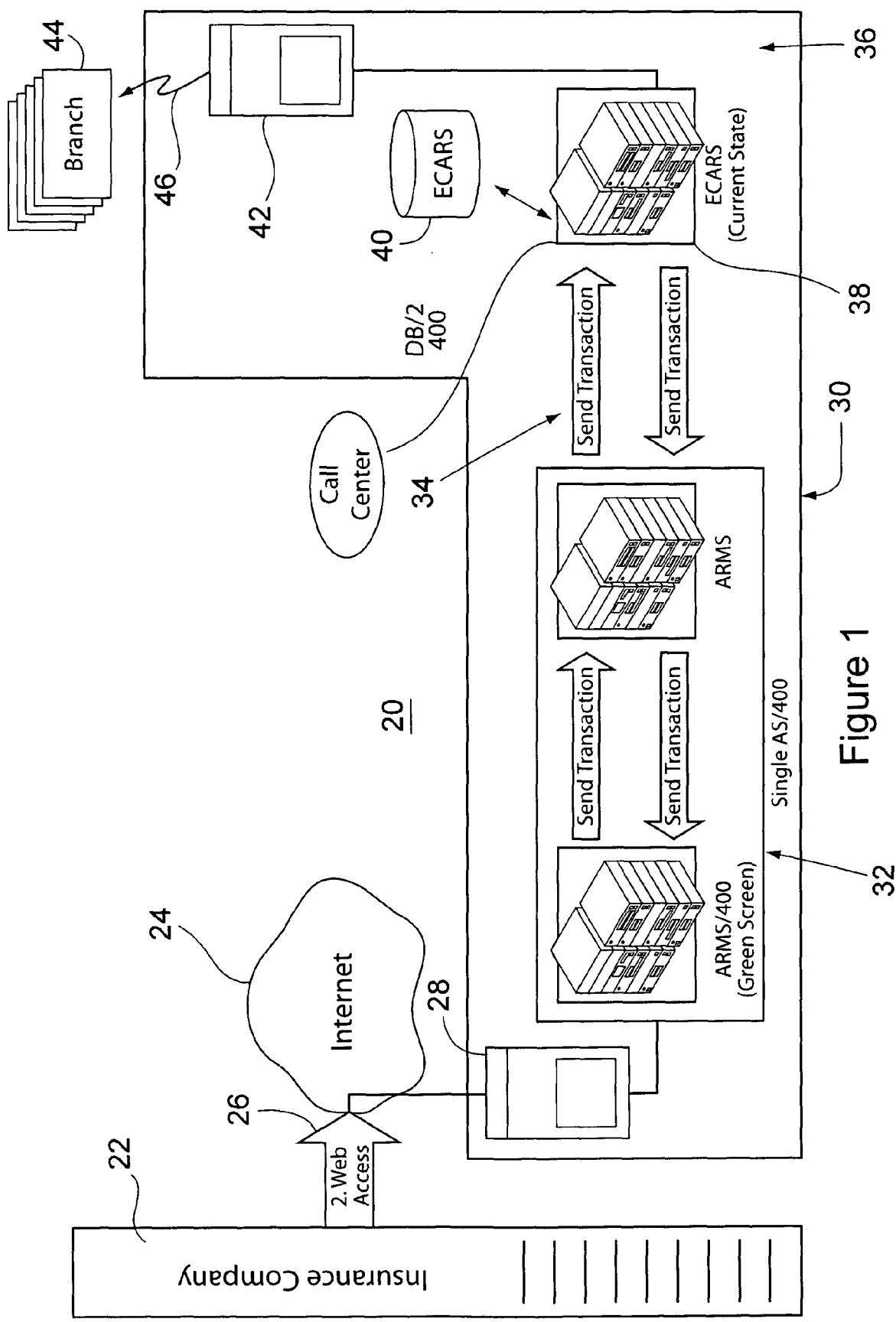
FIG. 1 is a schematic diagram of the computer systems comprising the first parent's invention.

The overall system architecture for the first parent's invention 20 is best shown in FIG. 1. As shown therein, an insurance company computer system 22, which itself may be virtually any computer configuration or even a stand alone PC accesses the Internet 24 through any convenient access point 26 such as even including an ISP (Internet service provider), as known in the art. Also connected to the Internet 24 is a web portal 28 which is preferably provided by a server appropriately programmed as explained herein below. This web portal 28 may be appropriately configured as desired to suit any particular business relationship or arrangement, although preferably the inventors herein and assignee of this invention have determined that a 24/7 or full time connection to the Internet 24 is preferable, except for scheduled downtimes for maintenance, etc. The service provider 30 which for purposes of explaining the first parent's preferred embodiment is preferably a vehicle rental organization, has itself an Internet portal mainframe 32 connected by a bi-directional communication link 34 to a second computer network 36 which may itself preferably have a mainframe server 38. This second computer system 36 is preferably a network having a database 40 for communication with what may be thousands of branch offices each of which has its own computer interface 44 which communicates to this second mainframe server 38 to conduct the integrated business functions of a service provider organization. Instead of communicating with the branch offices directly, a reservation may be communicated to a centralized location for further processing, such as a call center, and then relayed on to an appropriate branch office. This might be desirable under certain circumstances, such as if a branch office is closed, or when a purchaser requires some specialized service such as close monitoring of the rental. This may be done electronically and automatically, or with human intervention.

It should be noted that the particular computer configuration chosen as the preferred embodiment of the first parent's invention may itself be subject to wide variation. Furthermore, the term "mainframe" as used herein refers solely to a computer which can provide large scale processing of large numbers of transactions in a timely enough manner to suit the particular business application. Preferably, as is presently used by the assignee hereof, an IBM AS/400 mainframe computer is used as each of computers 32, 38. However, as is well known in the art, computer technology is subject to rapid change and it is difficult if not impossible to predict how these computer systems may evolve as technology advances in this art. For example, it is not beyond the realm of possibility that in the not so distant future a network of computers would provide the processing power to conduct these business operations as presently handled by "mainframe" computers. Thus, the term "mainframe" is not used in a limiting sense but merely to indicate that it is descriptive of a computer suited to handle the processing needs for a large scale business application.

It should also be noted that the communication link 46 extending between the server 42 and each of the branch offices 44 may have alternative configurations. For example, in some applications access over the Internet may itself be adequate, recognizing the vagaries of Internet service availability, reliability, and processing speed. Alternatively, this communication link 46 could well be a dedicated pipeline providing broadband service connection full time with back up connections to ensure continuous communication between a particular branch office or groups of branch offices and the service providers business operations computer system 36. Some branch offices might even be served through satellite links. Indeed, it is even possible that a mixture of these wide variations of service level be present within a single organization's structure depending upon communication link cost and availability balanced against service needs. It should merely be noted for present purposes that this communication link 46 serves as the electronic umbilical cord through which branch offices 44 communicate with the business computer system 36 of the invention.

Included as exhibits in parent incorporated patent application Ser. No. 10/343,576, published as U.S. Pat. App Pub 2005/0021378, now U.S. Pat. No. 8,374,894, and parent incorporated patent application Ser. No. 10/028,073, published as U.S. Pat. App Pub 2003/0125992, are functional descriptions of the software programs resident on the computers comprising the two computer systems 32, 38 which implement the first parent's invention. More particularly, Exhibit A from incorporated parent patent application Ser. No. 10/343,576 is a functional description of the software to implement the integrated business functions resident on the AS/400 or mainframe computer 38. Exhibit F from incorporated parent patent applicatin Ser. No. 10/028,073 is a functional description for a software program for computer 38 which implements GUI web-based, browser inter-connectivity with the branch offices. Exhibits B and C from incorporated parent patent application Ser. No. 10/343,576 are related flow diagrams and explanatory text, respectively, for the software resident on the mainframe AS/400 computer 32. Exhibit D from incorporated parent patent application Ser. No. 10/343,576 is a functional description of the software resident on computer 32 but which also appears on the server 28 which creates the web portal for access to the mainframe 32 and its resident program. Server 28 may use a bi-directional GUI to character based interface translator program, well known to those skilled in the art, to present the displays and information obtained and transmitted between the user and the computer 32. However, the software of Exhibit D from incorporated parent patent application Ser. No. 10/343,576 could also be run on server 28, as would be appreciated by those of skill in the art. It is believed that these functional descriptions and accompanying text as exemplified in these exhibits are adequate to enable an ordinary programmer to implement corresponding software programs for executing the preferred embodiment of the first parent's invention using ordinary programming skills and without inventive effort.

Figure 2:
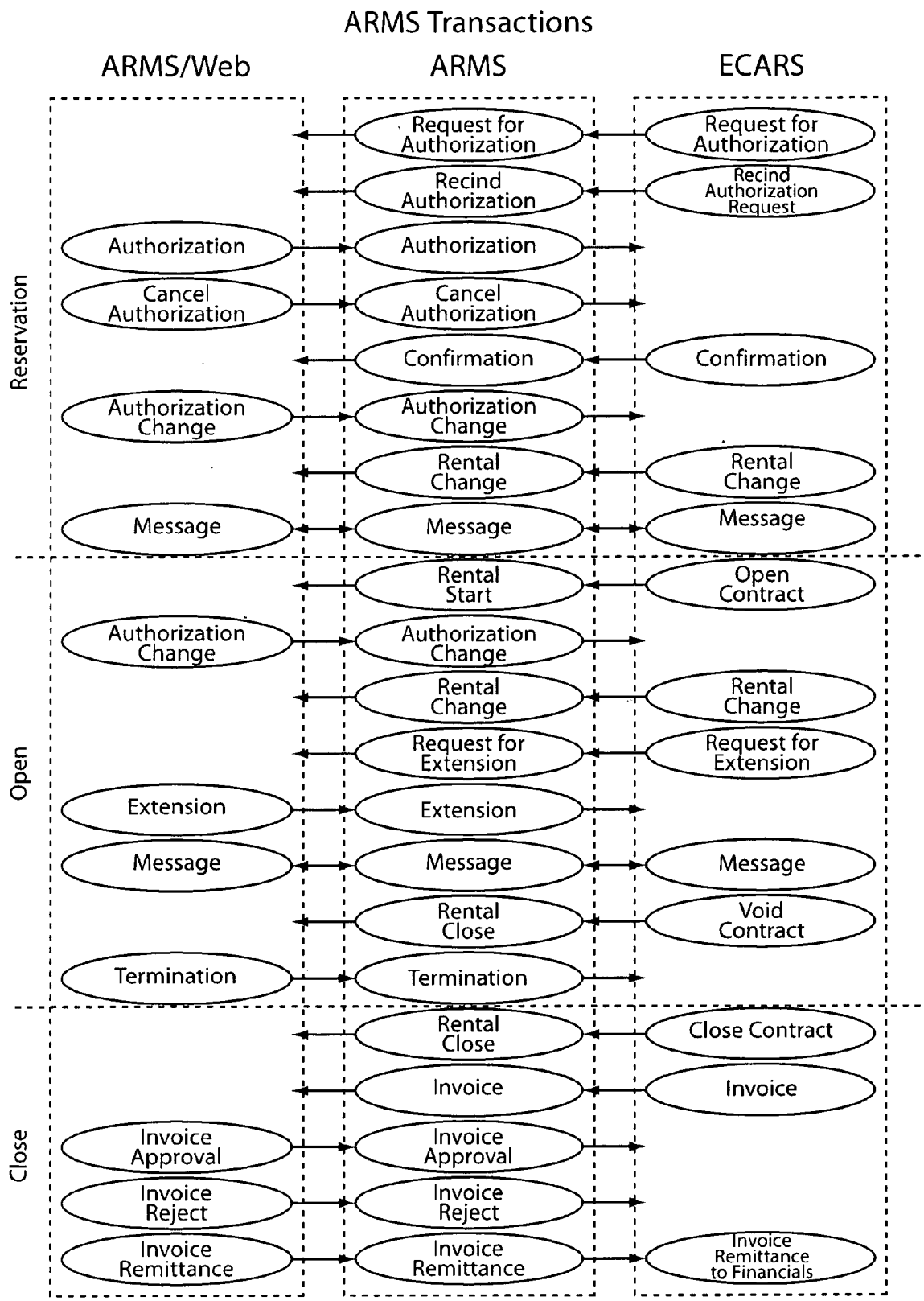
FIG. 2 is a flow chart of the software programs which communicate over the computer systems of FIG. 1 to implement the first parent's invention.

As a further example of the flow of data and the functional advantages provided by the first parent's invention, reference is made to FIG. 2. As shown therein, a right hand column is identified as "ECARS" which represents the integrated business software implemented as part of the mainframe operation 38 in computer network 36. The center column headed "ARMS" is resident on mainframe computer 32 and coordinates the communication of data. The left column headed "ARMS/WEB" represents the software resident on computer but which is presented on server 28 and accessible by users through the Internet. Along the left side of FIG. 2 are designated three separate sections of operational activity. These are "reservation" followed by "open" and concluded by "close". Generally, the functional descriptions are arranged in chronological order proceeding from the top of FIG. 2 to the bottom. However, some functional features are permitted throughout the entirety of one of the three periods designated at the left side of FIG. 2. One such example is the "message" function which allows messages to be sent between users at one business organization 22 and branch offices 44 and others connected to the other business organization 30. Proceeding with a description of the transaction, the first set of communications allow for the reservation of the services. These can include requests for authorization or a rescind authorization request to be sent from the service provider to the service purchaser. Correspondingly, authorizations and authorization cancels can be sent from the services purchaser to the services provider. Confirmations are communicated upon confirmation of an authorized reservation request. Authorization changes may be made and communicated from the services purchaser to the service provider. Corresponding rental transaction changes may be communicated from the services provider to the services purchaser. As indicated, through the entirety of this process messages may be sent between users and others connected or having access to the integrated business software, as desired. The consummation of this portion of the transaction is a reservation that has been placed, authorized, confirmed, and provision is made for changes as necessary. During the next phase of the transaction, a reservation is opened and services intended to be provided are started. Generally, and preferably for the rental of vehicles, a start and end date are established in the reservation process. However, along the way, transactional changes may be made, such as for changing the type of vehicle provided, extensions may be requested and entered from either business partner, messages may be transmitted between the business partners, and the transaction may be terminated such as by voiding the contract by one business partner or terminating the authority by the other business partner. The term "reservation" has been used herein to refer not only to the act of placing the order but also to filling the order for services including providing the rental vehicle to the ultimate user and even invoicing for those services.

The last phase of the process involves closing the transaction. During this phase of the transaction, the contract is indicated as being closed and invoiced, the services purchaser can approve invoices, reject invoices, and also remit invoices. Such invoice remittance may also include the actual transfer of funds through an electronic funds transfer medium, or otherwise as previously arranged between the business partners.

It should be understood that this is a streamlined description of the handling of a transaction, and by no means is exhaustive. For example, much more functionality is available to the user including accessing the data base to generate production reports regarding status of open or closed reservations, preparing action item lists to allow a user to organize and prioritize his work, obtaining information available in the system from having been entered by others which would otherwise require phone conversations which are inefficient and occupy still another person's time. A more detailed explanation of the functionality provided is found in the exhibits.

In summary, the first parent's invention creates almost an illusion that the services purchaser, and the great number of users at various levels of the multi-tier purchaser users, are actually part of the services provider organization in that immediate online access is provided to significant data which enable the user to make reservations for services, monitor those services as they are being provided, communicate with those providing the services obtain information relating to the status of services as they are being provided, and close transactions, all by interacting with the services provider business organization over that user's PC and without human interaction required by the business providers personnel. By way of contra-distinction, for many years business has been conducted on a human level by customers picking up the telephone and calling services providers and talking to their human counterparts in order to convey information, place orders, monitor orders, including obtaining information as to status, canceling orders, questioning invoices and paying invoices, along with a myriad of other related interactions. Not only did the conduct of business in this manner entail significant amounts of human resources at both ends of the transaction, but it also led to inefficiencies, mistakes and delays all of which increase the cost of doing business and contribute to an increased risk of services being rendered in an unsatisfactory manner in many instances to the end user. The first parent's invention has taken the preexisting solution of providing electronic communication between the business partners to another level by "web enabling" this system for improved connectivity, improved usability, reduced training, enhanced mobility, and other advantages as described herein.

Figure 3:
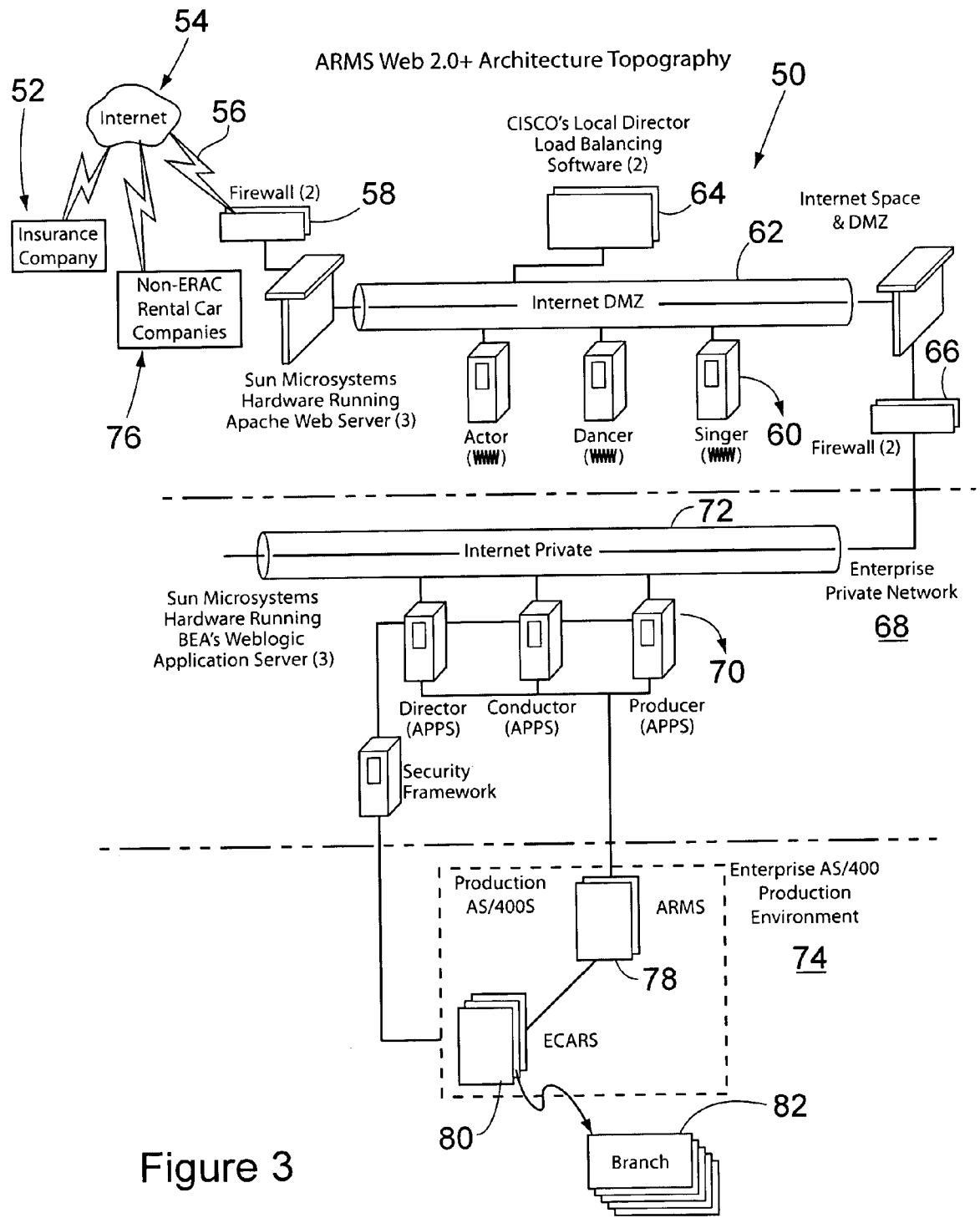
FIG. 3 is a schematic diagram of the computer systems comprising the second parent's invention.

A schematic diagram of the second parent's invention is shown in FIG. 3 and includes three levels of architecture. As shown in the first level of the architecture 50, a user 52 such as an insurance company or other user has access through the Internet 54 to the computer system comprising and incorporating the invention. An Internet provider provides a link 56 through which Internet connections may be made to communicate with the further described system. For convenience, this Internet connection may be considered as an Internet site or portal in that a user enters a URL and arrives at this connection. A firewall 58 as is known in the art is used for security purposes and to prevent hackers and the like from unauthorized access to the system. A first set of servers 60 are interconnected in a network 62 and may preferably include an ancillary server 64 for running load balancing software or the like to balance the load and provide redundancy amongst what may be a plurality of web servers 60. These web servers 60 may preferably be AIX servers or Sun Microsystem servers running Apache web server software, or other such suitable software as would be well known to those of ordinary skill in the art. This first web server network of servers 60, 62 process the random and disorderly communications flowing to and from this system and the Internet before passing them through a firewall 66 as a further precautionary measure. This first layer of architecture, identified as the Internet space/DMZ layer provides a secure interface and creates order out of the chaos of communications flowing between the system and others, as will be described.

With this architecture, stateless connections are accommodated. By supporting stateless connections, this embodiment eliminates the implementation difficulties encountered with the first parent's embodiment on the client. These implementation difficulties include installing extra software on the client side computers, and eliminates the need for special configuration of the internet access method, such as proxy servers or routers. For example, many proxy server are configured to disallow stateful connections for security reasons, i.e. to prevent unauthorized programs from establishing such connections. Another example is that routers are customarily configured with most ports closed and thereby unable to support stateful connections.

The next layer of architecture 68 is noted in the figure as the "Enterprise private network" and is comprised of a plurality of servers 70 network connected with a network connection 72. Again, although the choice of hardware is not considered critical by the inventors hereof, Sun Microsystem's or AIX's server/work station hardware is preferably used to provide the platform for running the application software for processing the various rental vehicle transactions, as will now be explained. Exhibit E from incorporated parent patent application Ser. No. 10/343,576 includes a series of functional design specifications for the ARMS/WEB application software resident on servers 70 and which provide the detailed description of the operational features of the software and system. With these functional design specifications for the individual modules, it would be readily apparent to those of ordinary skill in the art that programmers of ordinary skill would be able to write software to execute these functional specifications without using inventive effort. Furthermore, the details of this implementation are not considered to provide any aspect of the best mode for carrying out the invention which is defined by the claims below.

Generally, the ARMS/WEB application software permits a user to sign on and, when recognized, provides the series of menus presenting choices for the user to indicate the parameters for his reservation. A plethora of information is provided and accessible to the user through the various menus provided from which the user selects and enters data to process the reservation. An important feature of the ARMS/WEB application software is that it provides the user the opportunity to select to place his vehicle rental reservation not only with the integrated business computer system represented by the third level of architecture 74, described below, but also to route the reservation information back through the first architectural level 50 and into the Internet 54 for transmission to a competitive service provider 76. Although the interconnection is depicted in FIG. 3 as being made through the Internet 54, the network of servers 70 configured in accordance with the ARMS/WEB application software may utilize virtually any electronic means for transmitting the reservation information to a competitive services provider 76. These include email, automated telephone, facsimile, and other forms of electronic communication of course, the competitive services provider 76 may itself comprise an integrated business such that the level of interconnectivity provided to the user 52 may parallel that disclosed and described in connection with the integrated services provider system of the invention as well as the first parent's invention. This integrated business capability is represented as the third level 74 of the architectural topography shown in FIG. 3 which parallels portions of that shown in FIG. 1 in that a pair of network mainframe computers, such as AS/400's 78, 80 may process reservations to and from various branch offices 82 which are geographically diverse.

With the second-filed parent invention, the Internet portal provided by the ARMS/WEB network configured servers 70 provide an Internet portal for communication with not only the integrated computer enabled business system of the resident services provider, but also a portal for placing reservations to other competitive services providers 76. Thus, the user 52 enjoys the capability of accessing multiple service providers for competitive services through a single Internet connection using a single set of protocols, menus, etc. for the conduct of this business activity. Furthermore, the software configured network of servers 70 is readily configured in Web Logic to adapt to changing user requirements, data requirements, unique competitive service provider requirements, and other upgrades or modifications in a convenient manner by simply modifying the software resident therein. No special browser software of other interface software is required by the user and any special interconnecting software or server/hardware requirements may be satisfied as between the service providers such that the user is presented with a seamless interconnection. As the invention is configured and works well with the integrated business and computer systems as disclosed herein, it is anticipated that such interconnection and usability may be readily translated to any other such integrated computer system as might be found in other competitive service providers, as would be apparent to those of ordinary skill in the art. Thus, with the invention, a user is provided with among other things Internet access through a single portal to a plurality of service providers and, to the extent possible, to their integrated computer business systems.

The invention of the parent PCT application and its corresponding national phase application is sufficiently flexible to accommodate changes which are intended to adapt it for use with other business models, and especially those encountered in other countries. Furthermore, some of these changes add features that are equally applicable domestically. One such example is an "automated extensions" feature. Typically, there are many occasions when a damaged or inconvenienced vehicle is not made available for use when originally scheduled. In the prior art, many times an extension would then need to be requested through the system, with authorization requested and provided. In order to streamline this process, and to minimize delay and involvement of supervisory authority, the system may provide for some form of automatic extension authority. Preferably, this could be provided in any one of three modalities, or some combination thereof. A first modality would be for the service provider to have automatic extension authority, upon communication to the customer, within certain pre-determined limits. For example, an initial authorization may be for 12 days of a vehicle rental. A request for an extension of 5 days may be made by the service provider and of that 5 days 3 days may be authorized automatically as being within 25% of the original rental term and a request for the additional 2 days requiring approval may be automatically generated. Still another variation would be for the insurance company to set a limit within the system of the total number of authorized days, which could be based on some other parameter such as labor hours or body shop hours or down time for the repairs to take place. Then, upon request for an extension, one may be automatically granted based on the total authority allowed or initially set into the system by the insurance company, and up to that limit. Still another variation would be for a third party service provider to be involved in the process, such as a body shop, to make direct input into the system of a need for an extension. These authorized third party providers would preferably be pre-selected and their authority limited as described above. This feature may be implemented conveniently in a separate menu, for example as shown in the attached "screen shots" headed "Extend Rental".

Another feature of the parent PCT application and its corresponding national phase application is an offline usage feature which allows a user, such as an adjuster, to work with a laptop having loaded thereon a software program that emulates the connected network software for local processing of data, such as claims data. In use, an adjuster would preferably first connect to the system and download or "synch" his laptop data base with the claims data resident in the system. The adjuster would then disconnect and use his local program to work offline. Such work could include the generation of new reservations, authorization of direct billings, extension of rentals, approval of invoices, and setting of termination dates for on-going rentals, among other tasks. The user would then re-connect to the system, such as over an internet connection, sign in, and "synch" his laptop to the system which then transmits or executes his commands/communications to the central processor. The central processor checks the users "synch" data against its data file, advises the user of any "synch" data that is older than the current data, and requests the user to specify which data should be processed. After the processor is instructed by the user, it will then act on the "synch" data. For clarity, a first "screen shot" is provided that illustrates a sign in log for a user who wants to initiate a "synch", and a second "screen shot" is provided to illustrate a listing of activity that could have been created offline and which is available to be input to the system upon "synching". A preferences feature is provided to allow a user to establish defaults for automatic syncing of the data. Also, a history feature will allow the user to display all of the syncing activity from his connection or portal including error messages and conflicts noted.

Yet another feature of the parent PCT application and its corresponding national phase application allows for a user to enter, or execute, a full menu of transactions without individually opening them from a summary menu. This has been referred to as a "power template" feature. Instead, a hyperlink is provided to allow a user to jump into another menu of details for an individual item should it need to be changed and not entered as suggested, requested or listed on a user's action list.

Still another feature of the parent PCT application and its corresponding national phase application allows for the collection of user satisfaction feedback, and alerts to be entered for the attention to complaints, by the user right at his terminal. This capability allows for a text message to be entered as well as the name and contact information of the party making the feedback. As known in the service industry, and as discussed above, customer satisfaction is important and the faster a complaint can be registered and communicated to the proper person for correction, and then corrected, the more likely that a customer will view his experience favorably. By providing a pop up menu item capability, a user may from any one of a number of menus immediately enter the description of the problem and send it to the proper person electronically with a minimal amount of effort and a high degree of reliability. A convenient record may then be made of these "feedback" issues and entered into the system database. With this information stored electronically, it may be conveniently searched and analyzed for any recurring patterns, thereby identifying any particular person, branch, facility, or type of problem that should be addressed for action beyond the solution of the immediate problem. A "screen shot" is provided to illustrate how the "pop up" menu may appear, although it could be varied to allow for entry of other or additional information such as "trouble codes" allowing for the type of problem to be user classified, etc. A flow diagram is also provided to illustrate the flow for complaints, a methodology for processing them including escalating their importance and level of attention as the matter remains unresolved over time.

Still another feature of the parent PCT application and its corresponding national phase application that adds to the flexibility of the invention is a multiple adjuster feature, that can be extended to include an independent party control feature. In some countries, and in some business models either domestically or abroad, it may be preferable to have more than one adjuster be empowered to interact with or authorize certain facets of a vehicle rental transaction. In those situations, the invention can provide the flexibility and control needed to separately empower and control the interaction of multiple adjusters. For each user of the invention, an "Administration" schedule is set up by an authorizing agent, such as someone at the supervisory level of either the insurance company or the service provider, which grants authority for performing certain work activities as well as possibly limiting the amount of monetary authority allowed that adjuster. A "screen shot" is attached which exemplifies such authorization, with work activities including creating/authorizing reservations, maintain/extend rentals, pay invoices, user maintenance, receive unassigned action items, and reporting. This capability could be used to separately authorize different adjusters acting on behalf of the insurance company and the individual. In other words, the individual may need the car for 5 days but the individual's insurance coverage may only apply for 3 days while the insurance may pay for five days rental. This capability may also be further extended to independent third parties.

As extended for independent party management, this capability further adapts the invention for use with agencies such as "credit hire", "lawyer", "fleet management companies", or "repair facility", or "assist companies", all of which are found in other than domestic markets. Included herewith is an attachment which further explains the different types of independent parties routinely found at present, and examples of "screen shots" which provide the additional functionality of customizing authorizations for each of these independent parties for interacting with a rental transaction.

Yet another feature of the parent PCT application and its corresponding national phase application provided by the invention is a facility for marketing cars for sale/lease to customers. As explained above, a customer will occasionally be forced to replace his vehicle at the same time that he is renting a vehicle for temporary use. Furthermore, the value of the replacement vehicle, or the approved value that an insurance-company will allow under coverage, many times determines the available vehicles from which a customer will be allowed to select without personal expense. The invention of the parent PCT application and its corresponding national phase application is uniquely designed to provide a listing of available cars, and information about the cars, all from the existing rental car data base as is kept in routinely running the rental car company's main business of renting cars. It is a simple matter to provide a menu which allows a user to specify search through the car inventory with parameters such as zip code, vehicle category, make and model. Using any one or more of these parameters, a search inquiry will then produce a listing of available vehicles matching the parameters, along with additional information about the vehicle including mileage, selling price, and color as well as other accessories. A customer could then be advised of the search results and allowed to select a vehicle. The invention of the parent PCT application and its corresponding national phase application may, if agreed to by the insurance company, and possibly conditioned on the physical inspection of the car by the customer, then authorize the transfer of the vehicle to the customer as an outright settlement of his claim.

In implementing the replacement of the customers vehicle, a process preferably comprises the steps of an adjuster identifying the loss as a total loss which is preferably entered at the same time that a replacement vehicle rental is reserved, sending the vehicle data to a third party valuation tool for processing, determining the valuation of the vehicle by a suitable measure such as actual cash value (ACV), sending the ACV to the system, using the search function to identify possible replacement vehicles available for the customer, finalizing the replacement process with the customer including executing transfer of title documentation if desired, and posting the results of the vehicle replacement in the system for access by the insurance adjuster so that he can confirm that the customer's claim has been satisfied. A flow chart describing this process is attached for further explanation.

With the invention of the Ser. No. 10/028,073 application, the Internet connectivity of the parent filings has been extended to allow the integrated business employees to enjoy the same advantages as provided by the parent to the user's employees. Furthermore, the software configured network of servers 70 as shown in FIG. 3, as well as that comprising the integrated computer enabled business system of the resident services provider utilizing the present invention, is readily configured in Web Logic, or other suitable middleware, to adapt to changing user requirements, data requirements, unique competitive service provider requirements, and other upgrades or modifications in a convenient manner by simply modifying the software resident therein. Standard browser software with no special modifications may be used by the user, or by any branch employee, and any special interconnecting software or server/hardware requirements may be satisfied as between the third party service providers such that both the user and the branch employee is presented with a seamless interconnection. As the invention of the parent applications is configured and works well with the integrated business and computer systems as disclosed herein, it is anticipated that such interconnection and usability may be readily translated to any other such integrated computer system as might be found in other competitive service providers, as would be apparent to those of ordinary skill in the art. Thus, with the invention of the Ser. No. 10/028,073 application, not only is a user provided with Internet access through a single portal to a plurality of service providers and, to the extent possible, to their integrated computer business systems, a branch employee is also provided this same methodology for interacting with the system to handle transactions.

Figure 4:
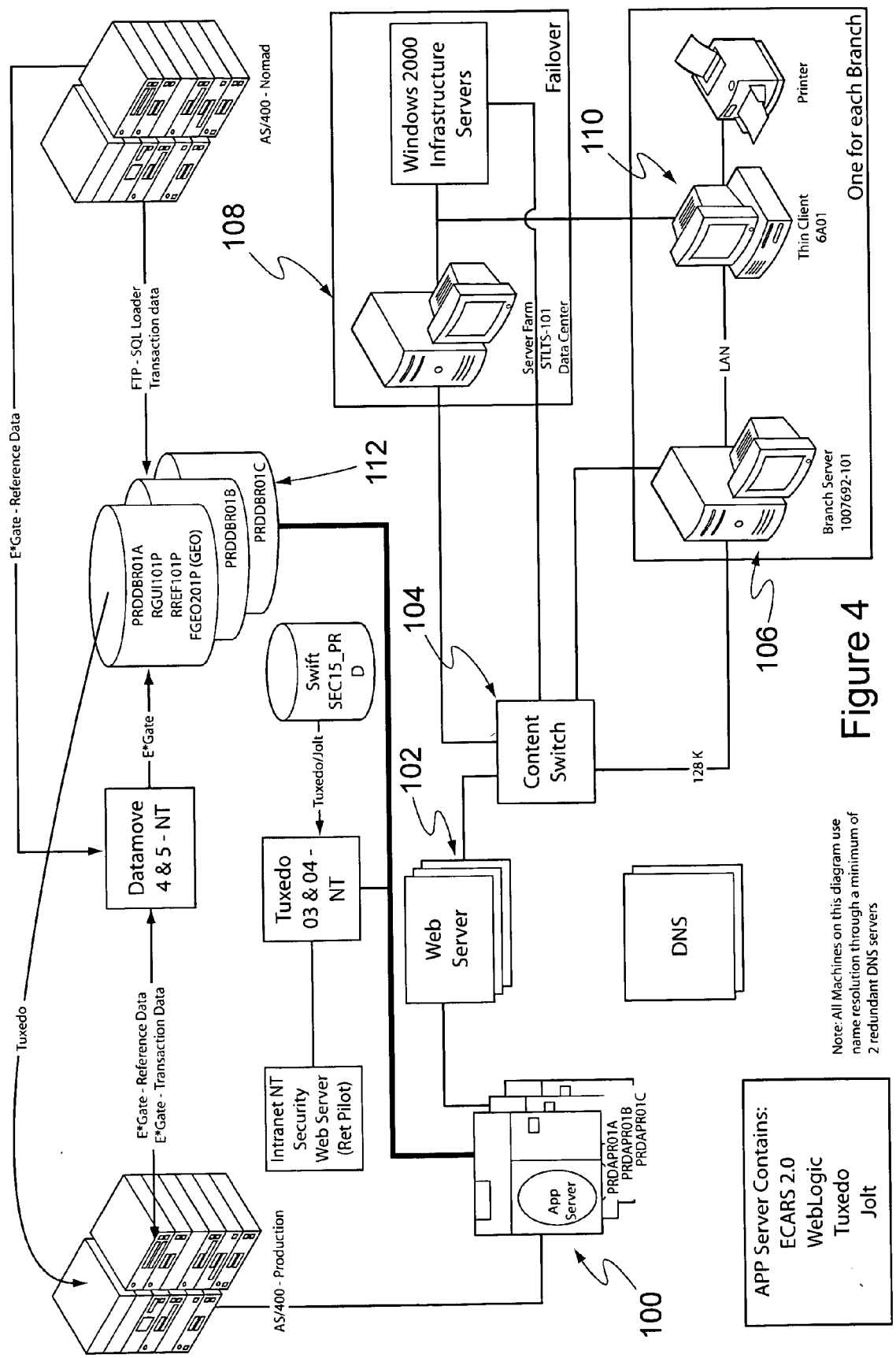
FIG. 4 is a schematic diagram of the computer systems comprising an aspect of the parent invention of the Ser. No. 10/028,073 application including communications between various components of FIG. 3.

A more detailed schematic layout of the integrated business computer network as implemented to provide the GUI web-based internet browser system of the Ser. No. 10/028,073 invention is shown in FIG. 4. As shown therein, an applications server 100 represents the second main frame shown in the earlier figures, and on it resides the main system software program which implements the invention. It is connected through a web server 102 and a load balancer 104 to a WAN for interconnection to a plurality of branch offices 106 and a "failover" configured server farm 108 or other computer network to accommodate excess traffic over the WAN demanding access to the applications server 100. Each branch office may have a "thin client" device 110 which is sufficient to access server 100 via a LAN or WAN that includes at least a web browser. The thin client 110 is typically also connected into a local network, with a number of other thin clients, to provide connectivity to a number of branch employees. The applications server 100 is also connected to a data base storage server 112, or the like, which may be operating an Oracle data base for storage of data corresponding to the transaction data describing the multitude of transactions handled through the system. The applications server 100 is directly connected to another main frame 114 which provides the management function and connectivity to the user, as explained in greater detail above.

Figure 5:
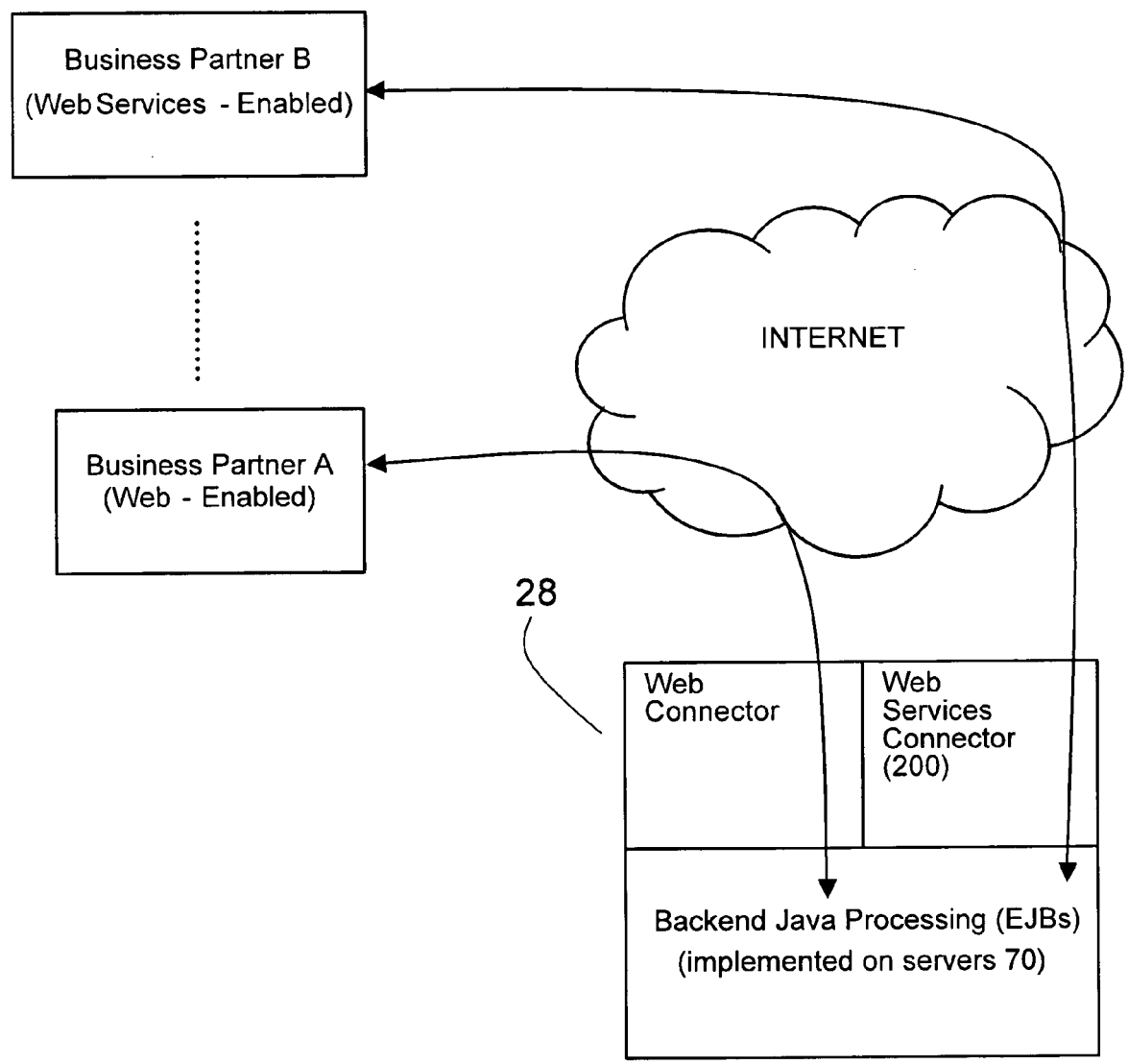
FIG. 5 is a block diagram illustration of a preferred web portal of the present invention.

FIG. 5 illustrates a preferred block diagram overview of web portal 28 configured to support web services-based communications with business partners. As described in FIG. 1, web portal 28 interfaces communications over the network from one or more business partners with the rental car service provider's back end AS/400 environment 32. With the parent inventions, these communications, preferably embodied as http screen data, from Business Partner A (which is not web services-enabled) preferably followed the flow of FIG. 5 through the web connector block to a backend processing engine on the portal 28 (preferably Java processing using Enterprise Java Beans (EJBs)). This backend processing is preferably implemented on servers 70 as described herein. With the present invention, a business partner who is web services-enabled with respect to the rental car service provider (Business Partner B in FIG. 5) communicates with the backend processing engine on servers 70 using web services connector 200.

Figure 6:
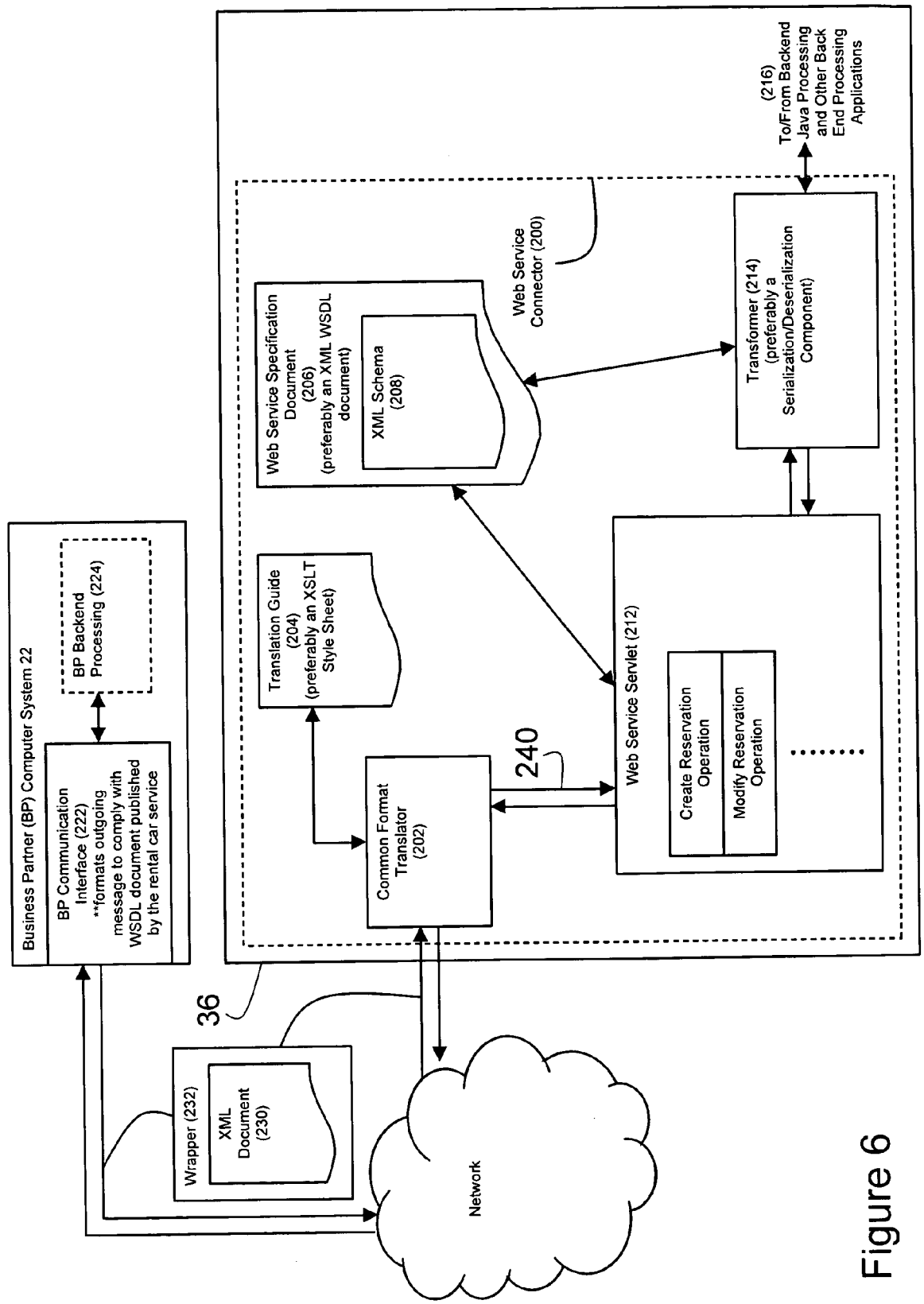
FIG. 6 depicts the components and manner of operation for a preferred web services connector.

FIG. 6 illustrates in greater detail a preferred design for the web services connector 200. As shown, in FIG. 6, a business partner can send a document 230 over a network such as the Internet to the rental car service provider's computer system 20. The document 230 is a message of variable length and variable format, preferably an XML document. The XML document 230 is also preferably enclosed in a wrapper such as a Simple Object Access Protocol (SOAP) envelope 232 and delivered over the network using the http protocol. In such an implementation, the http protocol can include a SOAP action line that specifies the type of web service operation being requested by the document 230.

So that the business partner may know how to properly communicate data with the web service connector 200, a web service specification document 206 is preferably made available to business partners by the rental car service provider, through publication thereof by the rental car service provider (e.g., posting document 206 online), communication (email, file transfer, etc.) from the rental car service provider to the business partners, or some other means. The web service specification document 206, which is preferably a Web Service Description Language (WSDL) document 206, describes the types of web service operations available from the rental car service provider, describes where to find the web service, and describes the data requirements for successfully communicating with the web service. In a preferred embodiment, an XML schema 208 comprises part of the WSDL document 206. The XML schema 208 describes these data requirements. A preferred WSDL document 208 for use with the present invention can be generated using ordinary skill in the art upon a review of the teachings herein.

Using the WSDL document 206, a technician of the business partner can appropriately program the business partner computer system 22 to format outgoing messages destined for the rental car service provider such that the data requirements of the XML schema 208 can be met. The technician can also program the business partner computer system 22 such that web service requests from the business partner are directed to the appropriate URL of the rental car service provider's web service, which is also identified in the WSDL document 206. The business partner can achieve this task with a web services communication interface 222 that functions similarly to the web services connector 200, albeit the communication interface 222 will format outgoing data from the data format of the business partner's back end system 224 to the XML format of the WSDL document 206. However, each business partner may choose to design a different interface 222 for communicating with the web services connector 200, as should be understood by those of ordinary skill in the art.

In fact, it is expected that different business partners will use slightly different formatting for their XML documents 230, typically driven by each business partner's own business needs. To accommodate such flexibility on the part of its business partners, the rental car service provider preferably uses a common format translator 202. Upon receipt of the XML document 230, the common format translator 202, which is preferably a servlet within web service connector 200, operates to translate each received XML document to a common XML format. Thus, any formatting heterogeneities between XML documents of different business partners can be eliminated by the translator 202. To commonly format the received XML documents 230, the translator 202 preferably accesses a translation guide such as an Extensible Stylesheet Language Transformation (XSLT) style sheet 204. The XSLT style sheet 204 defines how to map each business partner's XML document to an XML document of the common format desired by the web service connector 200. A separate XSLT style sheet 204 can be maintained for each business partner, if desired. The design of software code to implement the translator 202 and XSLT style sheet 204 is readily understood to those of ordinary skill in the art upon review of the teachings herein.

The translated XML document 240 produced by translator 202 is received by web service servlet 212. Web service servlet 212 functions to identify, using WSDL document 206, the web service operation that corresponds to XML document 240. Examples of preferred inbound web service operations supported by the present invention include a web service operation for a request to create a reservation ("Create Reservation"), a web service operation for a request to modify a reservation ("Modify Reservation"), a web service operation for a request to obtain price information for a reservation ("Get Rate"), a web service operation for a request to find a branch location at which a reservation is to be fulfilled ("Find Location"), a web service operation for a request to retrieve stored data relating to an existing reservation ("Get Reservation"), a web service operation for a request to stop charges on or terminate a reservation ("Stop Charges/Terminate"), a web service operation for a request to extend a reservation ("Extend Reservation"), a web service operation to return errors ("Error"), and a web service operation to cancel a reservation ("Cancel Reservation"). WSDL 206 defines the data requirements for interacting with each of these web service operations.

Once the proper web service operation for the XML document has been identified, The XML data of XML document 240 is passed to transformer software 214 which operates to transform the XML data of the XML document 240 to one or more data objects of the format supported by the backend processing of servers 70. To achieve this transformation, the transformer 212 preferably accesses the WSDL document 206 to identify how to appropriately map the XML data into Java objects 216. In a preferred embodiment, the transformer software 214 is a serialization/deserialization component that functions to transform the XML data of XML document 240 into one or more Java objects 216 that are passed to the business logic resident on backend servers 70.

While the web service servlet 212 and the transformer 214 can be custom-designed components, it is preferred that these two software components be implemented using commercially-available software. Suitable examples for the web service servlet 212 and transformer 214 include the AXIS software tool available from the Apache Software Foundation (http://www.apache.org), the NET software package from Microsoft, the WebSphere web services software package, and others as would be understood by those of ordinary skill in the art.

It is also worth noting that business partner computer system may be configured to support web service-based communications from the rental car service provider. In such a case, the business partner preferably makes a WSDL document available to the rental car service provider as described above in connection with WSDL document 206. The business partner's WSDL document will preferably describe the types of web service operations available from the business partner, describe where to find the web service, and describe the data requirements for successfully communicating with the web service. In turn, the web service connector 200 of FIG. 6 would then be used in a reverse manner, wherein Java objects 216 corresponding to a message to be sent to a business partner computer system are converted into an outgoing XML document using the WSDL document 206 and XSLT style sheet 204 by the transformer 214, web service servlet 212 and translator 202. Examples of outbound web service operations that are preferably supported by business partners include a confirmation message from the rental car service provider that a reservation has been created, an error message from the rental car service provider identifying any problems experienced in connection with a business partner's request, a message from the rental car service provider confirming that a reservation has been opened, a message from the rental car service provider that a reservation has been closed, a message from the rental car service provider communicating a request for authorization to extend a reservation, and a message from the rental car service provider communicating a request to cancel a reservation. The data requirements for such web service operations will presumably vary by business partner, as will be apparent from any WSDL documents made available by the business partners to the rental car service provider. Also, should a business partner computer system 22 not support web service messages from the rental car service provider, it is preferred that outgoing messages from the rental car service provider proceed through the web connector block of FIG. 5 as described in connection with the parent filings.

In operation, the web services connector of FIG. 6 operates as follows. First, a user of the business partner computer system 22 interacts with his/her computer to input data appropriate to a given web service, such as by typing data into fields of a display screen or by selecting available data values from drop down menus and the like. Once the user has completed these data entry tasks, the business partner's computer system 22 sends a web service request in the form of XML document 230 (within SOAP wrapper 232) to computer system 36 over a network such as the Internet. In this example, the web service request will be a Create Reservation web service request. At the receiving end, translator 202 operates to convert the received XML document 230 into an XML document of a common internal format using the XSLT style sheet 204.

The appropriate web service operation corresponding to the received XML document is then identified by web service servlet 212, and the transformer 214 thereafter transforms the XML data of XML document 240 into a plurality of Java objects 216 using WSDL document 206. Should any data formatting inconsistencies with respect to the requirements of WSDL document 206 be present in XML document 230, the combined operations of the translator 202, web service servlet 212, and transformer 214 will operate to return an error upon the detection of such an inconsistency. If such an error is detected, it is preferred that an appropriate message be sent to the business partner so that the business partner is aware of the problem. As such, the combined operations of the translator 202, web service servlet 212, and transformer 214 serve to effectively validate the received XML document 230 against the WSDL document 206.

Assuming no errors were detected in the received XML document, the Java objects 216 are passed to business logic on servers 70 that process the data contained in the Create Reservation request (such as insured/claimant name, start date/end date for reservation, pick-up location, etc.) using business logic and program calls to the AS/400 32 as necessary to create a reservation as requested by the business partner. Once the reservation has been created, a confirmatory message can be sent back to the business partner, either through the web connector block of FIG. 5 or through the web services connector 200 (in which case the preceding steps will be reversed, as explained above).

Various changes and modifications to the preferred embodiment as explained herein would be envisioned by those of skill in the art. Examples of these changes and modifications include the utilization of computer systems configured in any one of a myriad of ways using present technology alone. For example, if all business partners utilize the same data formatting for their XML messages, the translation functionality be translator 202 may be eliminated. Also, rather than a single WSDL document 206, the rental car service provider may create a plurality of WSDL documents, each associated with one or more business partners. In such an embodiment, the translator 202 may also be rendered an optional component. Further, while in the preferred embodiment, the web service connector 200 is under control of the rental car service provider, it should be noted that in alternate embodiments, the web service connector 200 can be under the control of the business partner or some other third party intermediary. Moreover, the web service connector 200 can be in communication with the computer systems of a plurality of rental vehicle service providers having rental vehicle software programs resident therein to thereby create a multivendor rental portal. Further still, web services connectors such as the ones described herein can be used to interface the AS/400 32 with ECARS 38 of FIG. 1. Likewise, the web services connectors such as the ones described herein can be used to interface ECARS 32 of FIG. 1 with branch computer systems 44. Also, mobile computers are presently available and wireless technology could be used to extend the integrated business network of the services provider, as well as match the mobility needed by the various users connected to and using the present invention. The particular software, and various aspects and features of its design, have been adapted for particular application to the vehicle rental business of course, computer software applications satisfying other business needs would necessarily require adaptation to their particular business models. Thus, it is envisioned by the inventors herein that the various software programs described herein would be matched to the particular business application to which the invention is utilized. These and other aspects of the preferred embodiment should not be viewed as limiting and instead be considered merely as illustrative of an example of the practical implementation of the present invention. These changes and modifications should be considered as part of the invention and the invention should be considered as limited only by the scope of the claims appended hereto and their legal equivalents.

What is claimed is:

1. An Internet-enabled automatic rental vehicle transaction system for managing a plurality of rental vehicle transactions for third party use placed by high volume customers, the system comprising:
   a processor; and
   a memory;
   wherein the processor and the memory comprise parts of a rental vehicle reservation management computer system configured to create and manage a plurality of rental vehicle reservations in response to user input received from a plurality of business partner computer systems, wherein the processor is configured to interact with the memory to execute a rental vehicle software program and a web service connector, the web service connector for connection in network between the Internet and the rental vehicle software program to process a plurality of rental vehicle transaction requests, the rental vehicle transaction requests being formatted in a pre-determined web services format; and
   wherein the web service connector comprises:
      a first software module configured to identify a type of rental vehicle transaction from among a plurality of types of rental vehicle transactions for a received rental vehicle transaction request, the plurality of types of rental vehicle transactions comprising at least two selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation;
      a web service specification document for defining a plurality of data and format requirements for the different types of rental vehicle transactions; and
      a second software module configured to transform the received rental vehicle transaction request into a plurality of data objects having a format processable by the rental vehicle software program according to the defined requirements in the web service specification document; and wherein the rental vehicle software program is further configured to receive the plurality of data objects and automatically perform an operation on the received data objects in accordance with the identified rental vehicle transaction type.

2. The system of claim 1 wherein the web service connector is further configured to translate outgoing messages from the rental vehicle software program to a destination one of the business partner computer systems into a web service format associated with the destination business partner computer system.

3. The system of claim 2 wherein the received rental vehicle transaction request comprises a variable length variable format request.

4. The system of claim 3 wherein said variable length variable format request comprises an XML request.

5. The system of claim 4 wherein one of the at least two types of rental vehicle transactions comprises a request to create a rental vehicle reservation.

6. The system of claim 4 wherein one of the at least two types of rental vehicle transactions comprises a request to modify a rental vehicle reservation.

7. The system of claim 4 wherein one of the at least two types of rental vehicle transactions comprises a request to extend a rental vehicle reservation.

8. The system of claim 4 wherein one of the at least two types of rental vehicle transactions comprises a request to cancel a rental vehicle reservation.

9. The system of claim 4 wherein one of the at least two types of rental vehicle transactions comprises a request to obtain a price rate for a rental vehicle reservation.

10. The system of claim 4 wherein one of the at least two types of rental vehicle transactions comprises a request to find a rental vehicle location at which a rental vehicle reservation for an insured or claimant is to be fulfilled.

11. The system of claim 4 wherein one of the at least two types of rental vehicle transactions comprises a request to retrieve stored data for an existing rental vehicle reservation.

12. The system of claim 4 wherein the at least two types of rental vehicle transactions comprises a request to terminate an existing rental vehicle reservation.

13. The system of claim 4 wherein one of the at least two types of rental vehicle transactions comprises a request to return any error messages for a rental vehicle reservation.

14. The system of claim 1 wherein the web service connector further comprises:

a translation guide for defining a translation between data having the web services format to a common format; and a common format translator configured to (1) translate the received rental vehicle transaction request to the common format according to the defined translation in the translation guide and (2) communicate the translated rental vehicle transaction request to the first software module.

15. The system of claim 14 wherein the rental vehicle reservation management computer system is configured for communication with a plurality of business partner computer systems, wherein at least a first business partner computer system is configured to generate rental vehicle transaction requests having a first format and wherein at least a second business partner computer system is configured to generate rental vehicle transaction requests having a second format, the second format being a different format than the first format, and wherein the translation guide comprises a first translation guide that defines a translation for rental vehicle transaction requests from the first business computer system to the common format and a second translation guide that defines a translation for rental vehicle transaction requests from the second business computer system to the common format.

16. The system of claim 15 wherein the first and second translation guides comprise first and second XSLT style sheets.

17. The system of claim 15 wherein the first and second business partner computer systems are configured with differing graphical user interfaces (GUIs) relative to each other for generating the rental vehicle transaction requests.

18. The system of claim 1 wherein the reservation management computer system is configured for communication with a plurality of business partner computer systems, and wherein the first and second business partner computer systems are configured with differing graphical user interfaces (GUIs) relative to each other for generating the rental vehicle transaction requests.

19. The system of claim 1 wherein the business partner computer system comprises a computer system of a repair facility at which a disabled vehicle is undergoing repairs, the disabled vehicle corresponding to a replacement rental vehicle that is a subject of at least one of the received rental vehicle transaction requests.

20. The system of claim 1 wherein the received rental vehicle transaction request comprises an XML document.

21. The system of claim 20 wherein the received rental vehicle transaction request further comprises a SOAP envelope within which the XML document is enclosed, the SOAP envelope comprising an action line that identifies the type of rental vehicle transaction for the received rental vehicle transaction request, and wherein the first software module is configured to identify the rental vehicle transaction type for the received rental vehicle transaction request based on referring to the action line.

22. The system of claim 1 wherein the plurality of types of rental vehicle transactions comprising at least three selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

23. The system of claim 1 wherein the plurality of types of rental vehicle transactions comprising at least four selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

24. The system of claim 1 wherein the plurality of types of rental vehicle transactions comprising at least five selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

25. The system of claim 1 wherein the plurality of types of rental vehicle transactions comprising at least six selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

26. The system of claim 1 wherein the plurality of types of rental vehicle transactions comprising at least seven selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

27. The system of claim 1 wherein the plurality of types of rental vehicle transactions comprising at least eight selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

28. The system of claim 1 wherein the plurality of types of rental vehicle transactions comprise a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

29. The system of claim 1 wherein the rental vehicle reservation management computer system further comprises a web connector in network between the Internet and the rental vehicle software program, wherein the web service connector is configured to interact with a first subset of the business partner computer systems to receive input for creating and managing a plurality of the rental vehicle reservations, and wherein the web connector is configured to (1) provide a plurality of graphical user interface (GUI) screens to a second subset of the business partner computer systems for display thereon, the GUI screens configured to receive input from a plurality of users of the second subset of the business partner computer systems for creating and managing another plurality of rental vehicle reservations, and (2) interface the input received through the GUI screens with the rental vehicle software program to create and manage the another plurality of rental vehicle reservations in accordance with the user input received through the GUI screens.

30. The system of claim 20 wherein the web service specification document is further configured to (1) describe the types of rental vehicle transactions, and (2) define a plurality of data requirements for communicating with a plurality of web services corresponding to the types of rental vehicle transactions, the data requirements including a plurality of mappings from XML data for rental vehicle transactions corresponding to the different types of rental vehicle transaction to data that is processable by the rental vehicle software program, wherein the first software module is further configured to identify the type of rental vehicle transaction from among the plurality of types of rental vehicle transactions for the received rental vehicle transaction request according to the described rental vehicle transaction types in the web service specification document, and wherein the second software module is further configured to transform XML data of the received rental vehicle transaction request into the plurality of data objects having the format processable by the rental vehicle software program according to the mappings in the web service specification document for the identified type of rental vehicle transaction for the received rental vehicle transaction request.

31. The system of claim 30 wherein the mappings comprise a plurality of mappings from XML data for rental vehicle transactions corresponding to the different types of rental vehicle transaction to Java data objects that are processable by the rental vehicle software program, and wherein the second software module is further configured to transform XML data of the received rental vehicle transaction request into a plurality of Java data objects that are processable by the rental vehicle software program according to the mappings in the web service specification document for the identified type of rental vehicle transaction for the received rental vehicle transaction request.

32. The system of claim 30 wherein the web service specification document is further configured to describe where to find the web services corresponding to the types of rental vehicle transactions.

33. The system of claim 1 wherein the processor comprises a plurality of processors.

34. The system of claim 33 wherein the plurality of processors comprise a first processor for executing the web service connector and a second processor for executing the rental vehicle software program.

35. A method for facilitating communications between an Internet-enabled automatic rental vehicle transaction system including a rental vehicle software program and a plurality of high volume customers, said communications comprising a plurality of rental vehicle transactions for third party use placed by said high volume customers, the method comprising:

creating and managing, by a rental vehicle reservation management computer system, a plurality of rental vehicle reservations in response to user input received from a plurality of business partner computer systems, the rental vehicle reservation management computer system comprising a processor and a memory, wherein the creating and managing step comprises the rental vehicle reservation management computer system executing a rental vehicle software program and executing a web service connector, the web service connector being in network between the Internet and the rental vehicle software program to process a plurality of rental vehicle transaction requests, the rental vehicle transaction requests being formatted in a pre-determined web services format, the web service connector comprising a first software module, a second software module, and a web service specification document;

wherein the web service connector executing step comprises:

identifying a type of rental vehicle transaction from among a plurality of types of rental vehicle transactions for a received rental vehicle transaction request, the plurality of types of rental vehicle transactions comprising at least two selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation, wherein the identifying step is performed by the web service connector using the first software module;

defining a plurality of data and format requirements for the different types of rental vehicle transactions, wherein the defining step is performed by the web service connector using the web service specification document; and transforming the received rental vehicle transaction requests into a plurality of data objects having a format processable by the rental vehicle software program according to the defined requirements in the web service specification document, wherein the transforming step is performed by the web service connector using the second software module; and wherein the rental vehicle software program executing step comprises:

receiving the plurality of data objects; and automatically performing an operation on the received data objects in accordance with the identified rental vehicle transaction type.

36. The method of claim 35 further comprising the web service connector translating outgoing messages from the rental vehicle software program to a destination one of the business partner computer systems into a web service format associated with the destination business partner computer system.

37. The method of claim 36 wherein the received rental vehicle transaction request comprises a variable length variable format request.

38. The method of claim 37 wherein said variable length variable format request comprises an XML request.

39. The method of claim 38 wherein the plurality of rental vehicle transaction types comprise at least three selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

40. The method of claim 38 wherein the plurality of rental vehicle transaction types comprise at least four selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

41. The method of claim 38 wherein the plurality of rental vehicle transaction types comprise at least five selected from the group consisting of a request to create a rental vehicle reservation, a request to modify a rental vehicle reservation, a request to extend a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

42. The method of claim 38 wherein the plurality of rental vehicle transaction types comprise at least six selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

43. The method of claim 38 wherein the plurality of rental vehicle transaction types comprise at least seven selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

44. The method of claim 35 wherein the web service connector further comprises a translation guide for defining a translation between data having the web services format to a common format and a common format translator, wherein the web service connector executing step further comprises (1) translating the received rental vehicle transaction request to the common format according to the defined translation in the translation guide, wherein the translating step is performed by the web service connector using the common translator and (2) communicating the translated rental vehicle transaction request to the first software module.

45. The method of claim 44 wherein the rental vehicle reservation management computer system is configured for communication with a plurality of business partner computer systems, wherein at least a first business partner computer system is configured to generate rental vehicle transaction requests having a first format and wherein at least a second business partner computer system is configured to generate rental vehicle transaction requests having a second format, the second format being a different format than the first format, wherein the translation guide comprises a first translation guide that defines a translation for rental vehicle transaction requests from the first business computer system to the common format and a second translation guide that defines a translation for rental vehicle transaction requests from the second business computer system to the common format, and wherein the translating step further comprises the common format translator (1) translating a received rental vehicle transaction request from the first business partner computer system to the common format using the first translation guide, and (2) translating a received rental vehicle transaction request from the second business partner computer system to the common format using the second translation guide.

46. The method of claim 45 wherein the first and second translation guides comprise first and second XSLT style sheets.

47. The method of claim 45 wherein the first and second business partner computer systems are configured with differing graphical user interfaces (GUIs) relative to each other for generating the rental vehicle transaction requests.

48. The method of claim 35 wherein the rental vehicle reservation management computer system is configured for communication with a plurality of business partner computer systems, and wherein the first and second business partner computer systems are configured with differing graphical user interfaces (GUIs) relative to each other for generating the rental vehicle transaction requests.

49. The method of claim 35 wherein the business partner computer system comprises a computer system of a repair facility at which a disabled vehicle is undergoing repairs, the disabled vehicle corresponding to a replacement rental vehicle that is a subject of at least one of the received rental vehicle transaction requests.

50. The method of claim 35 wherein the received rental vehicle transaction request comprises an XML document.

51. The method of claim 50 wherein the received rental vehicle transaction request further comprises a SOAP envelope within which the XML document is enclosed, the SOAP envelope comprising an action line that identifies the type of rental vehicle transaction for the received rental vehicle transaction request, and wherein identifying step further comprises the first software module identifying the rental vehicle transaction type for the received rental vehicle transaction request based on referring to the action line.

52. The method of claim 35 wherein the plurality of types of rental vehicle transactions comprising at least three selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

53. The method of claim 35 wherein the plurality of types of rental vehicle transactions comprising at least four selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

54. The method of claim 35 wherein the plurality of types of rental vehicle transactions comprising at least five selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

55. The method of claim 35 wherein the plurality of types of rental vehicle transactions comprising at least six selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

56. The method of claim 35 wherein the plurality of types of rental vehicle transactions comprising at least seven selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

57. The method of claim 35 wherein the plurality of types of rental vehicle transactions comprising at least eight selected from the group consisting of a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

58. The method of claim 35 wherein the plurality of types of rental vehicle transactions comprise a request to create a rental vehicle reservation, a request to modify a rental vehicle reservation, a request to extend a rental vehicle reservation, a request to cancel a rental vehicle reservation, a request to obtain a price rate for a rental vehicle reservation, a request to find a rental vehicle location at which a rental vehicle reservation for an insured or claimant is to be fulfilled, a request to retrieve stored data for an existing rental vehicle reservation, a request to terminate an existing rental vehicle reservation, and a request to return any error messages for a rental vehicle reservation.

59. The method of claim 35 wherein the rental vehicle reservation management computer system further comprises a web connector in network between the Internet and the rental vehicle software program, wherein the web service connector interacts with a first subset of the business partner computer systems to receive input for creating and managing a plurality of the rental vehicle reservations, the method further comprising:
providing a plurality of graphical user interface (GUI) screens to a second subset of the business partner computer systems for display thereon, the GUI screens configured to receive input from a plurality of users of the second subset of the business partner computer systems for creating and managing another plurality of rental vehicle reservations; and
interfacing the input received through the GUI screens with the rental vehicle software program to create and manage the another plurality of rental vehicle reservations in accordance with the user input received through the GUI screens; and
wherein the providing step and the interfacing step are performed by the rental vehicle reservation management computer system using the web connector.

60. The method of claim 50 wherein the web service specification document is further configured to (1) describe the types of rental vehicle transactions, and (2) define a plurality of data requirements for communicating with a plurality of web services corresponding to the types of rental vehicle transactions, the data requirements including a plurality of mappings from XML data for rental vehicle transactions corresponding to the different types of rental vehicle transaction to data that is processable by the rental vehicle software program, wherein the identifying step further comprises identifying the type of rental vehicle transaction from among the plurality of types of rental vehicle transactions for the received rental vehicle transaction request according to the described rental vehicle transaction types in the web service specification document, and wherein transforming step further comprises transforming XML data of the received rental vehicle transaction request into the plurality of data objects having the format processable by the rental vehicle software program according to the mappings in the web service specification document for the identified type of rental vehicle transaction for the received rental vehicle transaction request.

61. The method of claim 60 wherein the mappings comprise a plurality of mappings from XML data for rental vehicle transactions corresponding to the different types of rental vehicle transaction to Java data objects that are processable by the rental vehicle software program, and wherein the transforming step further comprises transforming XML data of the received rental vehicle transaction request into a plurality of Java data objects that are processable by the rental vehicle software program according to the mappings in the web service specification document for the identified type of rental vehicle transaction for the received rental vehicle transaction request.

62. The method of claim 60 wherein the web service specification document is further configured to describe where to find the web services corresponding to the types of rental vehicle transactions.

63. The method of claim 35 wherein the processor comprises a plurality of processors.

64. The method of claim 63 wherein the plurality of processors comprise a first processor executing the web service connector and a second processor executing the rental vehicle software program.

* * * * *